United States Patent
Va et al.

(10) Patent No.: US 12,366,925 B2
(45) Date of Patent: Jul. 22, 2025

(54) ROBUSTIFYING RADAR-BASED GESTURE RECOGNITION SOLUTION USING CONTEXTUAL INFORMATION

(71) Applicant: Samsung Electronics Co., Ltd., Suwon-si (KR)

(72) Inventors: Vutha Va, Plano, TX (US); Priyabrata Parida, Dallas, TX (US); Saifeng Ni, Santa Clara, CA (US); Anum Ali, Frisco, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/414,200

(22) Filed: Jan. 16, 2024

(65) Prior Publication Data
US 2025/0004561 A1    Jan. 2, 2025

Related U.S. Application Data

(60) Provisional application No. 63/523,474, filed on Jun. 27, 2023.

(51) Int. Cl.
*G06F 3/01*    (2006.01)
*G01S 7/41*    (2006.01)

(52) U.S. Cl.
CPC .............. *G06F 3/017* (2013.01); *G01S 7/415* (2013.01); *G06F 3/011* (2013.01)

(58) Field of Classification Search
CPC .... G06F 17/153; G06F 9/3001; G06F 18/214; G06F 3/0488; G06F 9/462; G06F 9/30; G06F 3/01; G06F 3/017; G06F 3/011; G06V 40/20; G06N 3/02; G06N 3/065; G06N 3/063
See application file for complete search history.

(56) References Cited

U.S. PATENT DOCUMENTS

| | | | |
|---|---|---|---|
| 11,567,770 B2 | 1/2023 | Pineda De Gyvez et al. | |
| 11,635,823 B1 * | 4/2023 | Hu | G06F 3/017 |
| | | | 345/156 |
| 11,822,732 B1 * | 11/2023 | Zhu | G06F 3/033 |

(Continued)

FOREIGN PATENT DOCUMENTS

| | | | |
|---|---|---|---|
| WO | 2022217288 A1 | 10/2022 | |
| WO | WO-2022217290 A1 * | 10/2022 | G01S 13/345 |

*Primary Examiner* — Olga V Merkoulova

(57) ABSTRACT

A method includes obtaining a gesture sample via a gesture classifier. The gesture sample includes parameters of features extracted from the radar signals based on user motion in performance of a gesture. The method includes determining whether to obtain feedback for a target gesture associated with the gesture sample. The method includes in response to a determination to obtain the feedback, obtaining the feedback for the target gesture. The feedback includes a label indicating a type of gesture. The method includes determining whether the gesture sample associated with the label is valid based on comparison to a dataset of pre-existing validated gesture samples and a distance threshold. The method includes in response to determining that the gesture sample associated with the label is valid, determining whether to update a model for the gesture classifier using the validated gesture sample as a training sample.

20 Claims, 17 Drawing Sheets

(56) References Cited

U.S. PATENT DOCUMENTS

| | | | |
|---|---|---|---|
| 2016/0259037 A1* | 9/2016 | Molchanov | G01S 7/0233 |
| 2018/0046255 A1 | 2/2018 | Rothera et al. | |
| 2018/0329049 A1* | 11/2018 | Amihood | G01S 13/88 |
| 2019/0383903 A1* | 12/2019 | Chao | G01S 7/36 |
| 2022/0104912 A1 | 4/2022 | Shelton, IV et al. | |
| 2022/0269926 A1* | 8/2022 | Pavlov | G06N 3/044 |
| 2022/0413620 A1 | 12/2022 | Sachidanandam et al. | |
| 2023/0324998 A1* | 10/2023 | Wang | G06V 10/62 |
| 2024/0027600 A1* | 1/2024 | Saleem | G06N 3/08 |
| 2024/0231505 A1* | 7/2024 | Hayashi | G06N 3/082 |

\* cited by examiner

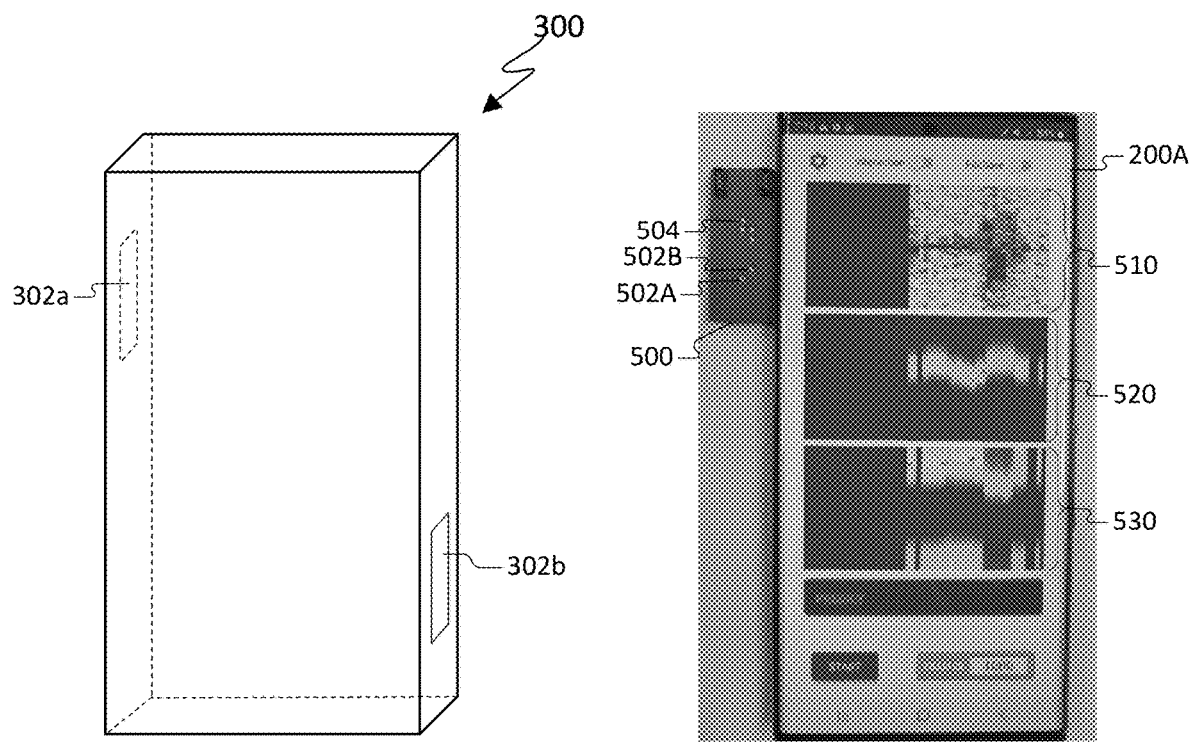
FIG. 3
FIG. 5A
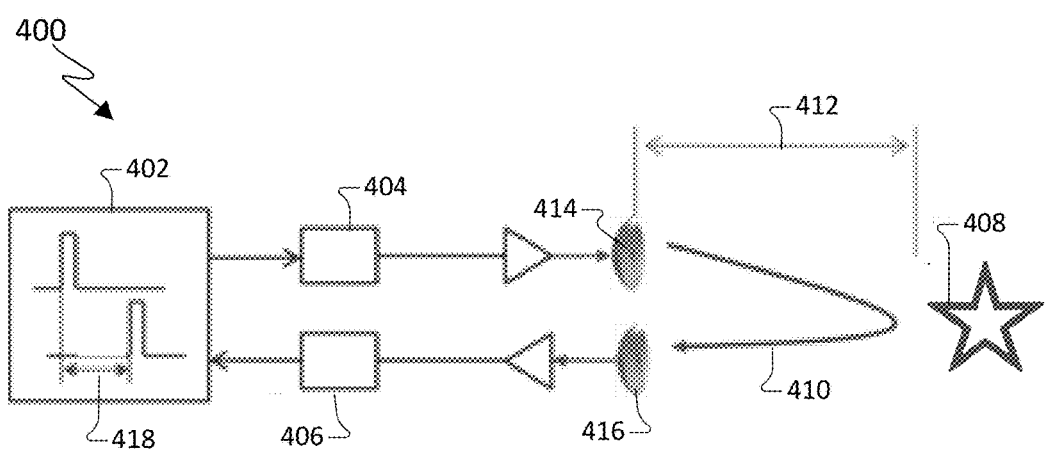
FIG. 4

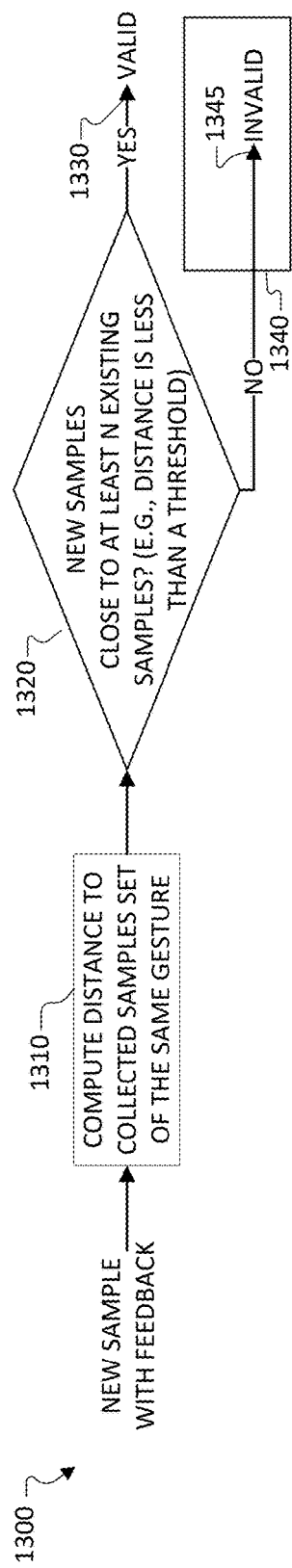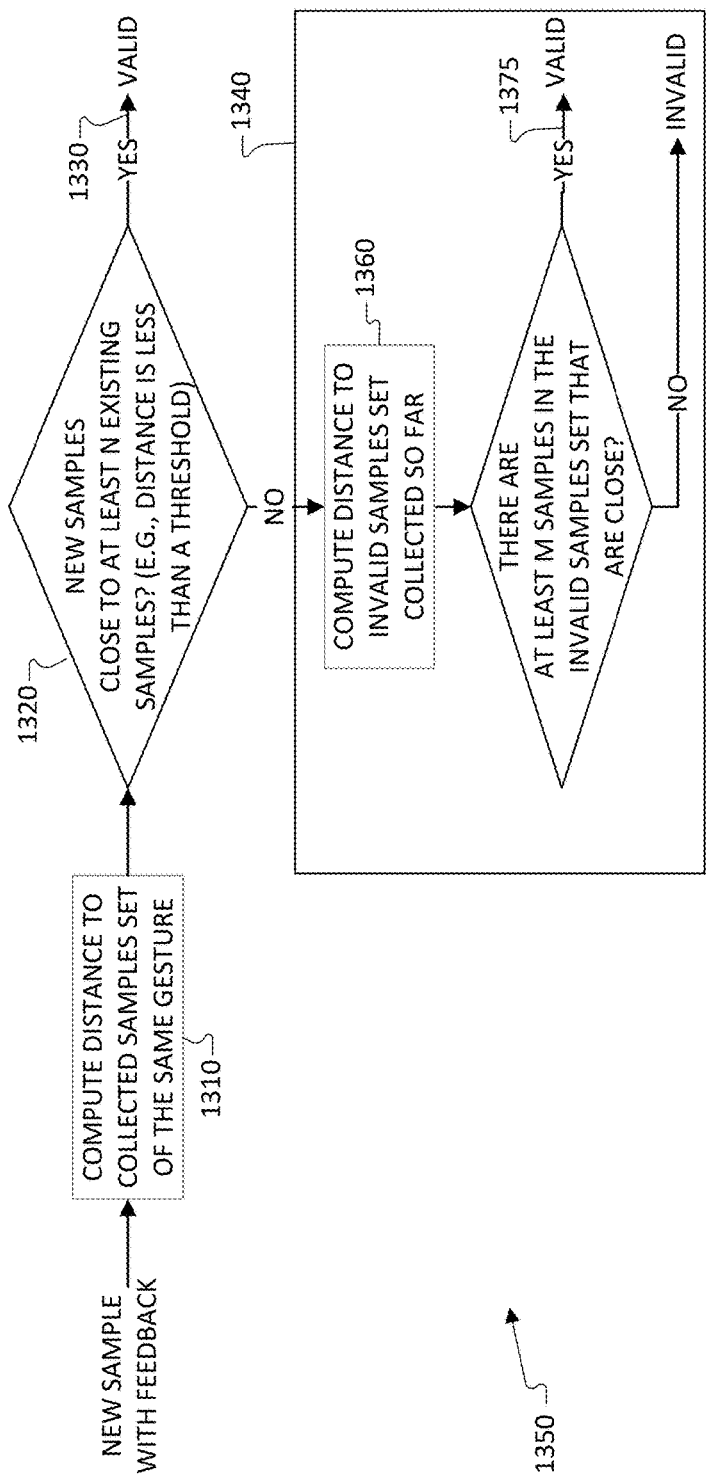
FIG. 13A
FIG. 13B

ROBUSTIFYING RADAR-BASED GESTURE RECOGNITION SOLUTION USING CONTEXTUAL INFORMATION

CROSS-REFERENCE TO RELATED APPLICATION AND CLAIM OF PRIORITY

This application claims priority under 35 U.S.C. § 119(e) to U.S. Provisional Patent Application No. 63/523,474 filed on Jun. 27, 2023. The above-identified provisional patent application is hereby incorporated by reference in its entirety.

TECHNICAL FIELD

This disclosure relates generally to radar systems. More specifically, this disclosure relates to methods and apparatus for robustifying radar-based gesture recognition solution using contextual information.

BACKGROUND

Gesture recognition can provide an intuitive interface for simple controls of mobile devices such as smartphones, tablets, augmented reality (AR) glasses, etc. Also, compared to a traditional gesture recognition that is an optic based solution, a gesture recognition using radar could be more power efficient and less of a privacy concern. Particularly, gesture recognition using radar could be more power efficient both for running the radar sensor as well as the associated processing of radar sensor data.

SUMMARY

This disclosure provides methods and apparatus for robustifying radar-based gesture recognition solution using contextual information.

In one embodiment, a method for robustifying radar-based gesture recognition solution using contextual information is provided. A method includes obtaining a gesture sample via a gesture classifier. The gesture sample includes parameters of features extracted from the radar signals based on user motion in performance of a gesture. The method includes determining whether to obtain feedback for a target gesture associated with the gesture sample. The method includes in response to a determination to obtain the feedback, obtaining the feedback for the target gesture. The feedback includes a label indicating a type of gesture. The method includes determining whether the gesture sample associated with the label is valid based on comparison to a dataset of pre-existing validated gesture samples and a distance threshold. The method includes in response to determining that the gesture sample associated with the label is valid, determining whether to update a model for the gesture classifier using the validated gesture sample as a training sample.

In another embodiment, an electronic device for robustifying radar-based gesture recognition solution using contextual information is provided. The electronic device includes a transceiver configured to transmit and receive radar signals, and a processor operably connected to the transceiver. The processor is configured to obtain a gesture sample via a gesture classifier. The gesture sample includes parameters of features extracted from the radar signals based on user motion in performance of a gesture. The processor is configured to determine whether to obtain feedback for a target gesture associated with the gesture sample. The processor is configured to in response to a determination to obtain the feedback, obtain the feedback for the target gesture. The feedback includes a label indicating a type of gesture. The processor is configured to determine whether the gesture sample associated with the label is valid based on comparison to a dataset of pre-existing validated gesture samples and a distance threshold. The processor is configured to in response to determining that the gesture sample associated with the label is valid, determine whether to update a model for the gesture classifier using the validated gesture sample as a training sample.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates a three-dimensional view of an example electronic device that includes multiple millimeter wave (mmWave) antenna modules in accordance with an embodiment of this disclosure;

FIG. 4 illustrates an example architecture of a monostatic radar in an electronic device 400 in accordance with an embodiment of this disclosure;

FIG. 5A illustrates a radar transceiver operably coupled to an electronic device that displays various examples of extracted features that are extracted from raw radar data in accordance with an embodiment of this disclosure;

FIG. 13A illustrates a method for validating a newly collected gesture sample based on first distance measurements, in accordance with an embodiment of this disclosure;

FIG. 13B illustrates a method for validating a newly collected gesture sample based on first distance measurements and second distance measurements, in accordance with an embodiment of this disclosure;

DETAILED DESCRIPTION

Figure 1:
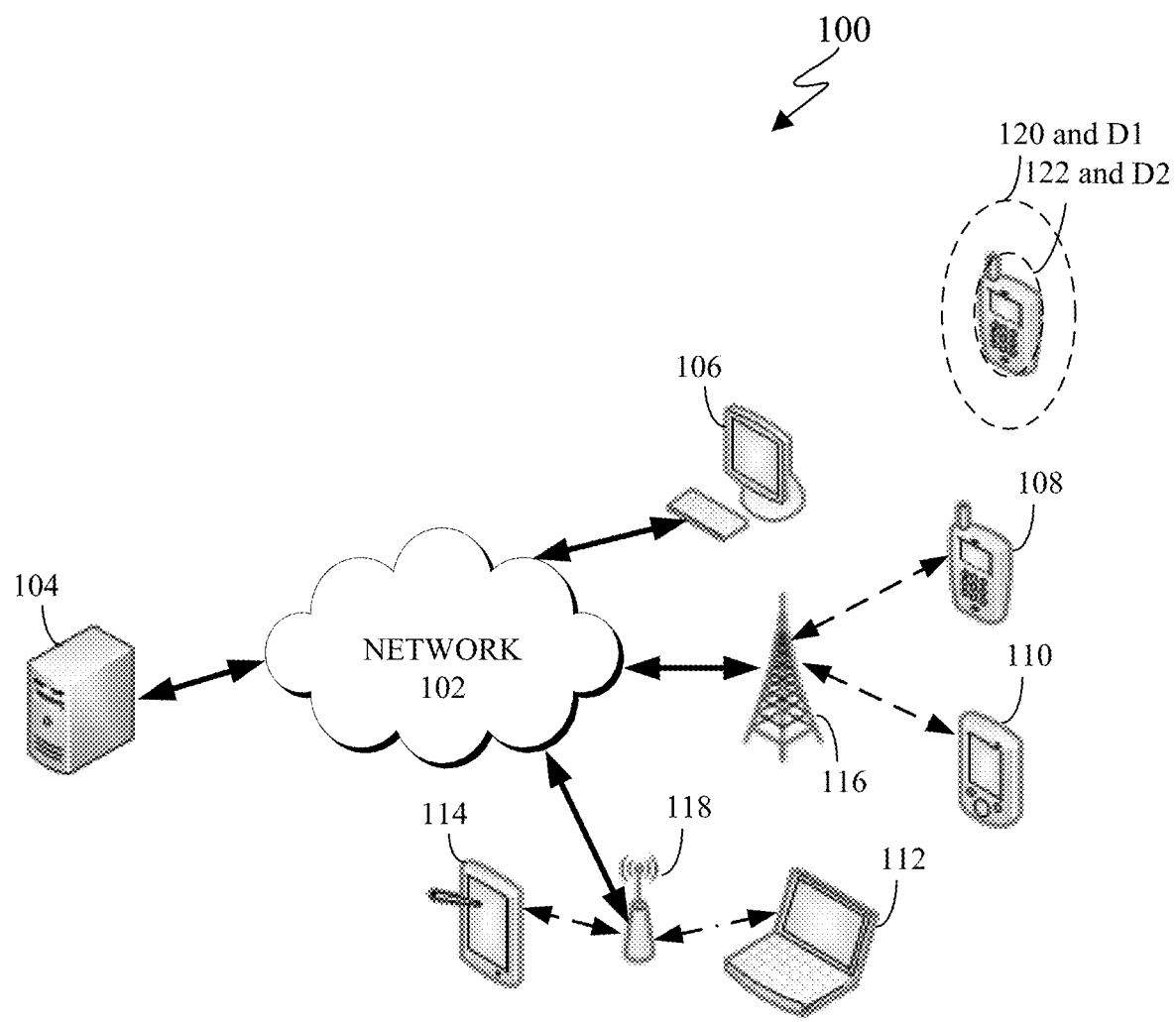
FIG. 1 illustrates an example communication system in accordance with an embodiment of this disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system or device.

Gesture recognition using radar however does have some challenges, particularly for micro gestures that involve some finger movements as the signature. Unlike optic/vision-based gesture recognition, radar signal reflection strength does depend on the shape, size, and material of the object. Additionally, radar resolution is not as high as the resolution of optical systems, in both range and angle. Accordingly, a radar signal might capture a gesture differently than an optical system. For example, while the movement of fingers might be dominant and clear visually (e.g., using an optical sensor), such movement of fingers might not be dominant and clear in the case of using a radar signal (e.g., using a radar-based sensor). The movement of the fingers might be masked out (at least in part) by the stronger reflections from the knuckle/hand Limited angle resolution may prevent differentiation between a single-finger movement versus multiple-fingers movement, especially when the fingers move together in the same direction. The shape and size of the user's hand and fingers as well as the manner of how the gesture is performed (e.g., the speed profile) could also have large influence on the captured radar signals.

The gestures could be designed so that some of these disadvantages could be mitigated (e.g., avoid having similar gestures distinguished only by the use of single-finger movement versus multiple-fingers movement), but the radar-based sensor may still be prone to having some robustness issues. Examples of radar-based sensor robustness issues, which may include: (1) performance could still have strong user-dependency such that performance for some fraction of the users might be bad; (2) certain pairs of gestures could be confused more frequently than others, especially because certain types of motions that look very distinct in optical vision might not be as distinct in the case of a radar signal (e.g., using radar-based sensor); (3) differentiation to undesired motions (referred to as non-gestures) other than gestures that are in a gesture vocabulary can be challenging for a subset of gestures in the gesture vocabulary; and (4) temporal correlation in wrong output prediction. Through experiments, situations were observed where a wrong prediction of the same gesture could persist for a number of trials, consecutively. Often times, it is difficult to visually distinguish between good and bad cases for such a situation, perhaps due to the temporal correlation in how a user conducts the gestures.

This disclosure provides several solutions that improve the robustness of a gesture recognition system (GRS), with emphasis on the gesture classifier (GC) by using contextual information that could be obtained from user's explicit feedback, from some sensor's (including the radar itself) data, as well as from usage patterns. In this disclosure, the contextual information is readily available or derivable from existing information available on the electronic device without any need for new hardware. Using such contextual information, a first technical solution is to refine the gesture classifier. A second technical solution uses contextual information to optimize the parameter choices and/or classifier model choices. A third technical solution uses contextual information to optimize operation by balancing between complexity and performance.

FIG. 1 illustrates an example communication system in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. Any of the client devices 106-114 can emit and collect radar signals via a radar transceiver.

The client devices 106-114 are able to sense the presence of an object located close to the client device and determine whether the location of the detected object is within a first area 120 or a second area 122 closer to the client device than a remainder of the first area 120 that is external to the first area 120. In certain embodiments, the boundary of the second area 122 is at a proximity that is almost touching the client device, and the first area 120 can be a within a close range (e.g., 1 meter away, or 2 meters away) from the client device. In some embodiments, a region of interest (ROI) is the area within the first area 120 and outside the second area, where the client device expects a hand of a person to be performed. The boundaries of the first and second areas 120 and 122 can define the ROI, enabling the client device to distinguish from the second area 122 within which a user's hand may perform a touch input or a hover gesture in close proximity to the client device, and enabling the client to distinguish from a too-far area beyond and outside of the first area such that a user's hand motion is unlikely to be accurately detected as a gesture or such that the user unlikely intends the user's hand motion to be used to control the client device. For example, the ROI can be defined as a range of distance from the client device, such as less than or equal to a first distance D1 where the boundary of the first area 120 is located, and greater than a second distance D2 where the boundary of the second area 122 is located.

In this example, some client devices 108 and 110-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
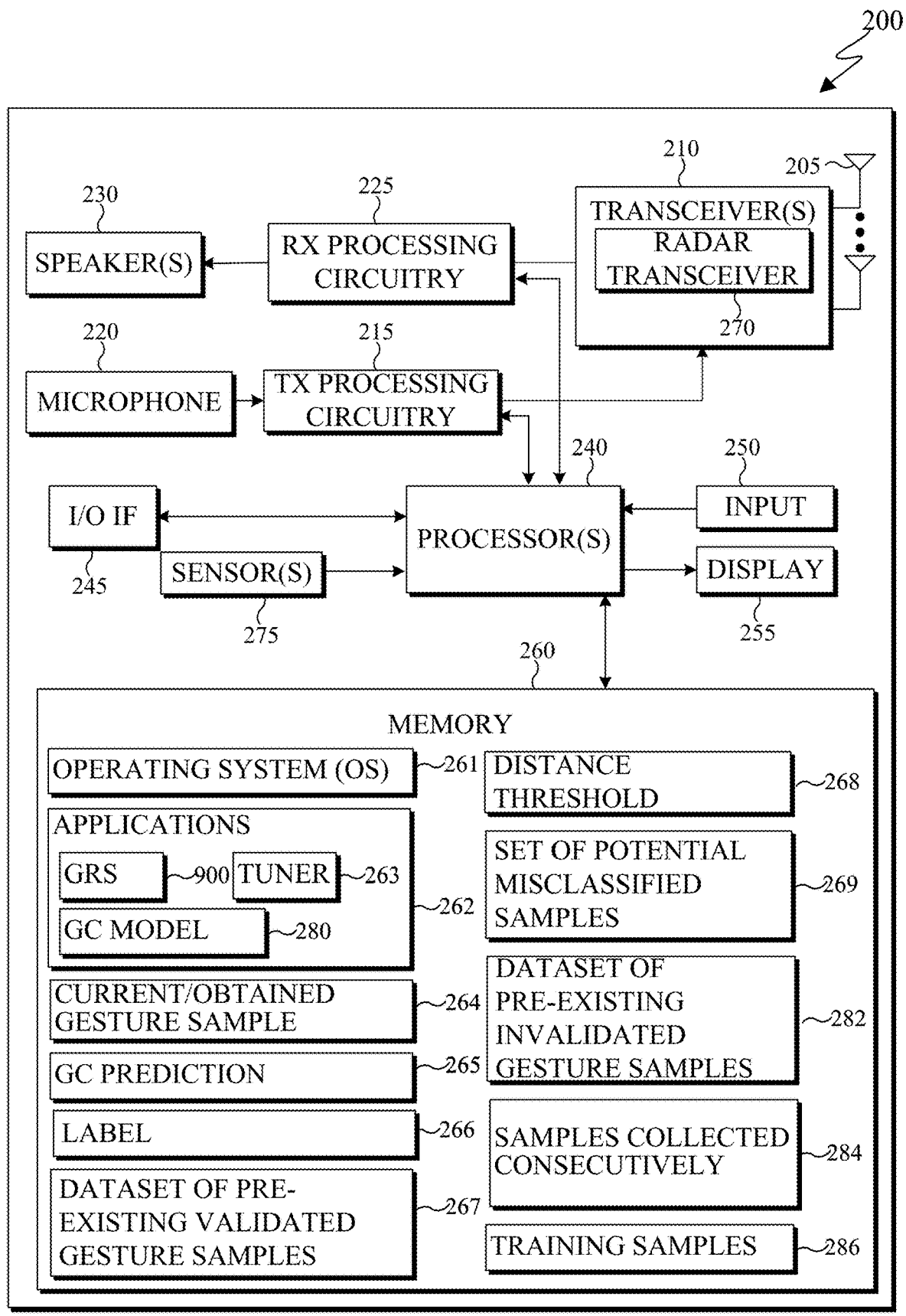
FIG. 2 illustrates an example electronic device in accordance with an embodiment of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 275. The memory 260 includes an operating system (OS) 261, and one or more applications 262.

The transceiver(s) 210 can include an antenna array 205 including numerous antennas. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, 6G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of downlink (DL) channel signals and the transmission of uplink (UL) channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

In accordance with embodiments of this disclosure, the applications 262 can include a gesture recognition system (GRS) 900 that recognizes a dynamic gesture, such as a micro-gesture recognition application that recognizes a dynamic micro-gesture. Additionally, one of the applications 262 is a tuner 263 that obtains a current gesture sample 264 from the GRS 900. The output (illustrated as "GC prediction") 265 from a gesture classifier corresponds to the current gesture sample 264 and is also obtained by the tuner 263. The output 990 from the gesture classifier 980 can include a predicted gesture type and a corresponding prediction confidence value, and so forth. The tuner 263 analyzes a label 266, a dataset of pre-existing validated gesture samples 267, a distance threshold 268, or a set of potentially misclassified samples 269, in order to determine whether the current gesture sample 264 associated with the label 266 is valid for use as a training sample and to determine whether to update a model 280 for the gesture classifier using the validated gesture sample as a training sample among multiple training samples 286. Additional details of the GRS 900, tuner 263, and model 280 are described further below.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user to interact with the electronic device 200. For example, the input 250 can include voice recognition processing, thereby allowing a user to input a voice command In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 275, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active-matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 275 that can meter a physical quantity or detect an activation state of the electronic device 200 and convert metered or detected information into an electrical signal. For example, the sensor 275 can include one or more buttons for touch input, a camera, a gesture sensor, optical sensors, cameras, one or more inertial measurement units (IMUs), such as a gyroscope or gyro sensor, and an accelerometer. The sensor 275 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 275 can further include control circuits for controlling any of the sensors included therein. Any of these sensor(s) 275 may be located within the electronic device 200 or within a secondary device operably connected to the electronic device 200.

The electronic device 200 as used herein can include a transceiver that can both transmit and receive radar signals. For example, the transceiver(s) 210 includes a radar transceiver 270, as described more particularly below. In this embodiment, one or more transceivers in the transceiver(s) 210 is a radar transceiver 270 that is configured to transmit and receive signals for detecting and ranging purposes. For example, the radar transceiver 270 may be any type of transceiver including, but not limited to a WiFi transceiver, for example, an 802.11ay transceiver. The radar transceiver 270 can operate both radar and communication signals concurrently. The radar transceiver 270 includes one or more antenna arrays, or antenna pairs, that each includes a transmitter (or transmitter antenna) and a receiver (or receiver antenna). The radar transceiver 270 can transmit signals at various frequencies. For example, the radar transceiver 270 can transmit signals at frequencies including, but not limited to, 6 GHz, 7 GHz, 8 GHz, 28 GHz, 39 GHz, 60 GHz, and 77 GHz. In some embodiments, the signals transmitted by the radar transceiver 270 can include, but are not limited to, millimeter wave (mmWave) signals. The radar transceiver 270 can receive the signals, which were originally transmitted from the radar transceiver 270, after the signals have bounced or reflected off target objects in the surrounding environment of the electronic device 200. In some embodiments, the radar transceiver 270 can be associated with the input 250 to provide additional inputs to the processor 240.

In certain embodiments, the radar transceiver 270 is a monostatic radar. A monostatic radar includes a transmitter of a radar signal and a receiver, which receives a delayed echo of the radar signal, which are positioned at the same or similar location. For example, the transmitter and the receiver can use the same antenna or nearly co-located while using separate, but adjacent antennas. Monostatic radars are assumed coherent such that the transmitter and receiver are synchronized via a common time reference. FIG. 4, below, illustrates an example monostatic radar.

In certain embodiments, the radar transceiver 270 can include a transmitter and a receiver. In the radar transceiver 270, the transmitter can transmit millimeter wave (mmWave) signals. In the radar transceiver 270, the receiver can receive the mmWave signals originally transmitted from the transmitter after the mmWave signals have bounced or reflected off target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the object by mapping the various distances.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

FIG. 3 illustrates a three-dimensional view of an example electronic device 300 that includes multiple millimeter wave (mmWave) antenna modules 302 in accordance with an embodiment of this disclosure. The electronic device 300 could represent one or more of the client devices 106-114 in FIG. 1 or the electronic device 200 in FIG. 2. The embodiments of the electronic device 300 illustrated in FIG. 3 are for illustration only, and other embodiments can be used without departing from the scope of the present disclosure.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

The first antenna module 302a and the second antenna module 302b are positioned at the left and the right edges of the electronic device 300. For simplicity, the first and second antenna modules 302a-302b are generally referred to as an antenna module 302. In certain embodiments, the antenna module 302 includes an antenna panel, circuitry that connects the antenna panel to a processor (such as the processor 240 of FIG. 2), and the processor.

The electronic device 300 can be equipped with multiple antenna elements. For example, the first and second antenna modules 302a-302b are disposed in the electronic device 300 where each antenna module 302 includes one or more antenna elements. The electronic device 300 uses the antenna module 302 to perform beamforming when the electronic device 300 attempts to establish a connection with a base station (for example, base station 116).

FIG. 4 illustrates an example architecture of a monostatic radar in an electronic device 400 in accordance with an embodiment of this disclosure. The embodiments of the architecture of the monostatic radar illustrated in FIG. 4 are for illustration only, and other embodiments can be used without departing from the scope of the present disclosure.

The electronic device 400 that includes a processor 402, a transmitter 404, and a receiver 406. The electronic device 400 can be similar to any of the client devices 106-114 of FIG. 1, the electronic device 200 of FIG. 2, or the electronic device 300 of FIG. 3. The processor 402 is similar to the processor 240 of FIG. 2. Additionally, the transmitter 404 and the receiver 406 can be included within the radar transceiver 270 of FIG. 2. The radar can be used to detect the range, velocity and/or angle of a target object 408. Operating at mmWave frequency with GHz of bandwidth (e.g., 2, 3, 5 or 7 GHz bandwidth), the radar can be useful for applications such as proximity sensing, gesture recognition, liveness detection, mmWave blockage detection, and so on.

The transmitter 404 transmits a signal 410 (for example, a monostatic radar signal) to the target object 408. The target object 408 is located a distance 412 from the electronic device 400. In certain embodiments, the target object 408 corresponds to the objects that form the physical environment around the electronic device 400. For example, the transmitter 404 transmits a signal 410 via a transmit antenna 414. The signal 410 reflects off the target object 408 and is received by the receiver 406 as a delayed echo, via a receive antenna 416. The signal 410 represents one or many signals that can be transmitted from the transmitter 404 and reflected off the target object 408. The processor 402 can identify the information associated with the target object 408 based on the receiver 406 receiving the multiple reflections of the signals.

The processor 402 analyzes a time difference 418 from when the signal 410 is transmitted by the transmitter 404 and received by the receiver 406. The time difference 418 is also referred to as a delay, which indicates a delay between the transmitter 404 transmitting the signal 410 and the receiver 406 receiving the signal after the signal is reflected or bounced off the target object 408. Based on the time difference 418, the processor 402 derives the distance 412 between the electronic device 400, and the target object 408. The distance 412 can change when the target object 408 moves while electronic device 400 is stationary. The distance 412 can change when the electronic device 400 moves while the target object 408 is stationary. Also, the distance 412 can change when the electronic device 400 and the target object 408 are both moving. As described herein, the electronic device 400 that includes the architecture of a monostatic radar is also referred to as a radar 400.

The signal 410 can be a radar pulse as a realization of a desired "radar waveform," modulated onto a radio carrier frequency. The transmitter 404 transmits the radar pulse signal 410 through a power amplifier and transmit antenna 414, either omni-directionally or focused into a particular direction. A target (such as target 408), at a distance 412 from the location of the radar (e.g., location of the transmit antenna 414) and within the field-of-view of the transmitted signal 410, will be illuminated by RF power density $p_t$ (in units of W/m$^2$) for the duration of the transmission of the radar pulse. Herein, the distance 412 from the location of the radar to the location of the target 408 is simply referred to as "R" or as the "target distance." To first order, $p_t$ can be described by Equation 1, where $P_T$ represents transmit power in units of watts (W), $G_T$ represents transmit antenna gain in units of decibels relative to isotropic (dBi), $A_T$ represents effective aperture area in units of square meters (m$^2$), and $\lambda$ represents wavelength of the radar signal RF carrier signal in units of meters. In Equation 1, effects of atmospheric attenuation, multi-path propagation, antenna losses, etc. have been neglected.

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2} \quad (1)$$

The transmit power density impinging onto the surface of the target will reflect into the form of reflections depending on the material composition, surface shape, and dielectric behavior at the frequency of the radar signal. Note that off-direction scattered signals are typically too weak to be received back at the radar receiver (such as receive antenna 416 of FIG. 4), so typically, only direct reflections will contribute to a detectable receive signal. In essence, the illuminated area(s) of the target with normal vectors pointing back at the receiver will act as transmit antenna apertures with directivities (gains) in accordance with corresponding effective aperture area(s). The power of the reflections, such as direct reflections reflected and received back at the radar receiver, can be described by Equation 2, where $P_{refl}$ represents effective (isotropic) target-reflected power in units of watts, $A_t$ represents effective target area normal to the radar direction in units of m$^2$, $G_t$ represents corresponding aperture gain in units of dBi, and RCS represents radar cross section in units of square meters. Also in Equation 2, $r_t$ represents reflectivity of the material and shape, is unitless, and has a value between zero and one inclusively ([0, . . . , 1]). The RCS is an equivalent area that scales proportional to the actual reflecting area-squared, inversely proportional with the wavelength-squared, and is reduced by various shape factors and the reflectivity of the material itself. For a flat, fully reflecting mirror of area $A_t$, large compared with $\lambda^2$, RCS=$4\pi A_t^2/\lambda^2$. Due to the material and shape dependency, it is generally not possible to deduce the actual physical area of a target from the reflected power, even if the target distance R is known. Hence, the existence of stealth objects that choose material absorption and shape characteristics carefully for minimum RCS.

$$P_{refl} = p_t A_t G_t \sim p_t A_t r_t \frac{A_t}{(\lambda^2/4\pi)} = p_t RCS \quad (2)$$

The target-reflected power ($P_R$) at the location of the receiver results from the reflected-power density at the reverse distance R, collected over the receiver antenna aperture area. For example, the target-reflected power ($P_R$) at the location of the receiver can be described by Equation 3, where $A_R$ represents the receiver antenna effective aperture area in units of square meters. In certain embodiments, $A_R$ may be the same as $A_T$.

$$P_R = \frac{P_{refl}}{4\pi R^2} A_R = P_T \cdot RCS \frac{A_T A_R}{4\pi \lambda^2 R^4} \quad (3)$$

The target distance R sensed by the radar 400 is usable (for example, reliably accurate) as long as the receiver signal exhibits sufficient signal-to-noise ratio (SNR), the particular value of which depends on the waveform and detection method used by the radar 500 to sense the target distance. The SNR can be expressed by Equation 4, where k represents Boltzmann's constant, T represents temperature, and kT is in units of W/Hz]. In Equation 4, B represents bandwidth of the radar signal in units of Hertz (Hz), F represents receiver noise factor. The receiver noise factor represents degradation of receive signal SNR due to noise contributions of the receiver circuit itself.

$$SNR = \frac{P_R}{kT \cdot B \cdot F} \quad (4)$$

If the radar signal is a short pulse of duration $T_P$ (also referred to as pulse width), the delay $\tau$ between the transmission and reception of the corresponding echo can be expressed according to Equation 5, where c is the speed of (light) propagation in the medium (air).

$$\tau = 2R/c \quad (5)$$

In a scenario in which several targets are located at slightly different distances from the radar 400, the individual echoes can be distinguished as such if the delays differ by at least one pulse width. Hence, the range resolution ($\Delta R$) of the radar 400 can be expressed according to Equation 6.

$$\Delta R = c\Delta\tau/2 = cT_P/2 \quad (6)$$

If the radar signal is a rectangular pulse of duration $T_P$, the rectangular pulse exhibits a power spectral density P(f) expressed according to Equation 7. The rectangular pulse has a first null at its bandwidth B, which can be expressed according to Equation 8. The range resolution $\Delta R$ of the radar 400 is fundamentally connected with the bandwidth of the radar waveform, as expressed in Equation 9.

$$P(f) \sim (\sin(\pi f T_P)/(\pi f T_P))^2 \quad (7)$$

$$B = 1/T_P \quad (8)$$

$$\Delta R = c/2B \quad (9)$$

Although FIG. 4 illustrates one example radar 400, various changes can be made to FIG. 4. For example, the radar 400 could include hardware implementing a monostatic radar with 5G communication radio, and the radar can utilize a 5G waveform according to particular needs. In another example, the radar 400 could include hardware implementing a standalone radar, in which case, the radar transmits its own waveform (such as a chirp) on non-5G frequency bands such as the 24 GHz industrial, scientific and medical (ISM) band. In another particular example, the radar 400 could include hardware of a 5G communication radio that is configured to detect nearby objects, namely, the 5G communication radios has a radar detection capability.

Figure 5B:
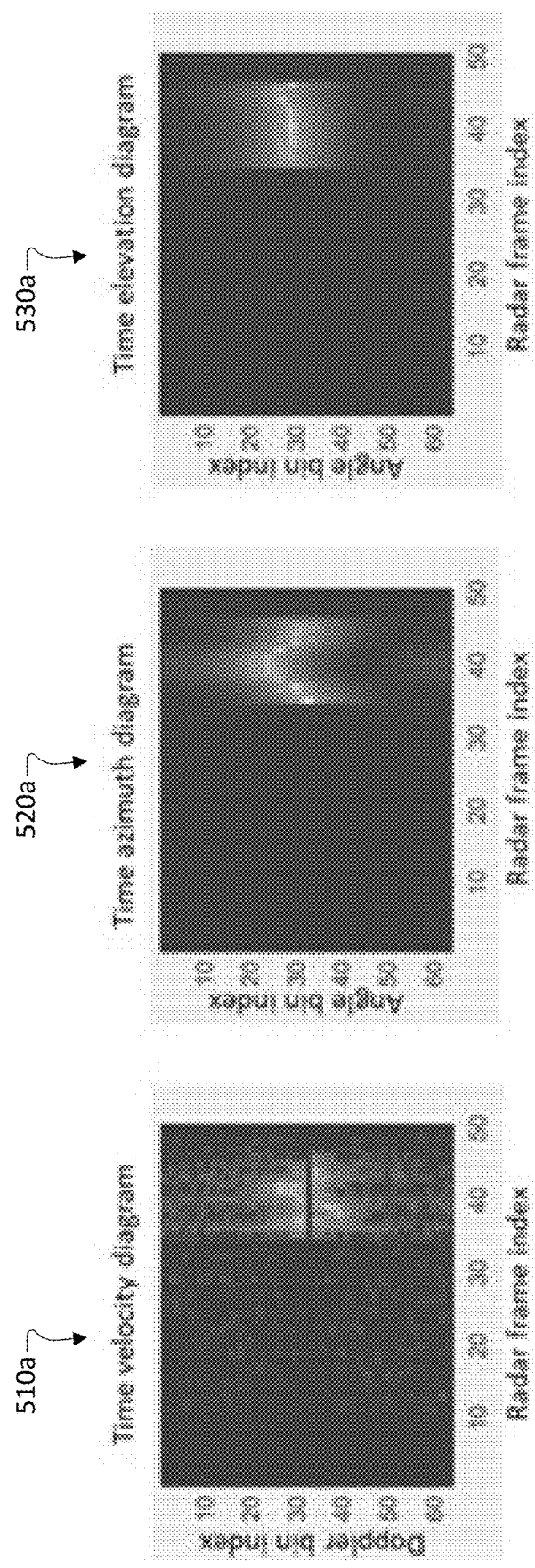
FIG. 5B illustrates example extracted features of TVD, TAD, and TED that are extracted from radar data corresponding to a center-right-center finger swipe gesture, in accordance with an embodiment of this disclosure.

FIG. 5A illustrates a radar transceiver 500 operably coupled to an electronic device 200a that displays various examples of extracted features 510, 520, 530 that are extracted from raw radar data in accordance with an embodiment of this disclosure. In the embodiment shown, the radar transceiver module 500 includes at least one TX antenna 502a-502b and at least one RX antenna 504. The display of the electronic device 200a shows diagrams of time velocity data (TVD) 510, time azimuth data (TAD) 520, and time elevation data (TED) 530. The embodiments of the extracted features 510, 520, 530 shown in FIG. 5 are for illustration only, and other embodiments could be used without departing from the scope of this disclosure. For example, FIG. 5B illustrates example extracted features of TVD 510a, TAD 520a, and TED 530a that are extracted from radar data corresponding to a center-right-center finger swipe gesture, in accordance with an embodiment of this disclosure.

Figure 6:
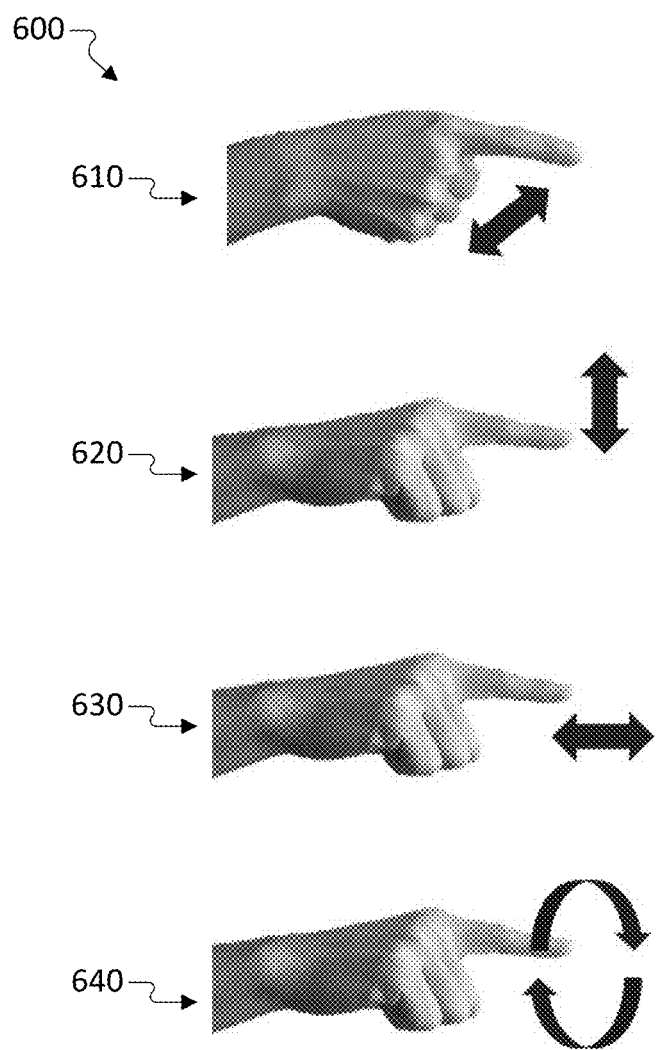
FIG. 6 illustrates a gesture set that forms a gesture vocabulary in accordance with an embodiment of this disclosure.

FIG. 6 illustrates a gesture set that forms a gesture vocabulary 600 in accordance with an embodiment of this disclosure. The embodiment of the gesture vocabulary 600 shown in FIG. 6 is for illustration only, and other embodiments could be used without departing from the scope of this disclosure. For example, the gesture vocabulary 600 can include more or fewer gestures.

As an example only, the gesture vocabulary 600 of this disclosure is a set of predetermined gestures that includes four dynamic micro-gestures, namely, total four gestures, as shown in FIG. 6. The gesture vocabulary 600 includes a center-right-center (CRC) swipe gesture 610, a center-up-center (CUC) swipe gesture 620, a poke gesture 630, and a circle gesture 640.

Figure 7:
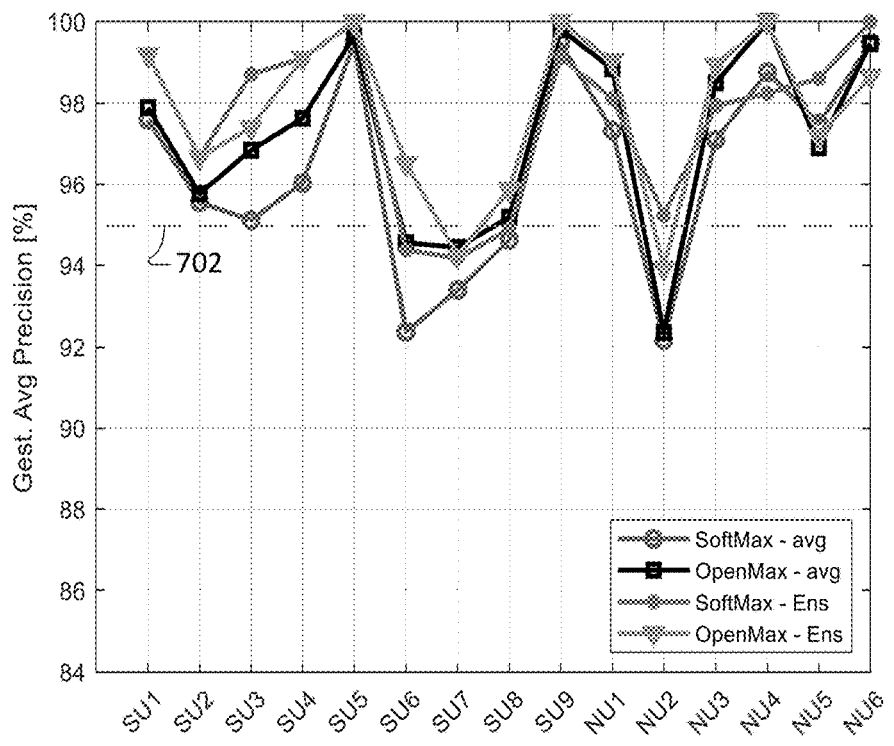
FIG. 7 illustrates a graph of average precision of a gesture classifier for different users in accordance with an embodiment of this disclosure.

FIG. 7 illustrates a graph 700 of average precision of a gesture classifier for different users in accordance with an embodiment of this disclosure. The embodiment of the graph 700 shown in FIG. 7 is for illustration only, and graphs of other embodiments could be yielded as results from other experimental trials used without departing from the scope of this disclosure.

As part of a procedure for evaluating performance of a gesture classifier, the radar data and corresponding classification data are collected from hand motion of one or more users. In this test case, the x-axis represents the fifteen users (SU1-SU9 and NU1-NU6) from whom data was collected. The seen users SU1-SU9 participated in a previous experiment of testing a gesture recognition system, and as a result, additional data was collected from the seen users compared to data collected from the new users NU1-NU6 who had never participated in an experimental trial for evaluating performance of a gesture recognition system.

The y-axis represents average precision of a gesture classifier. The value of the precision changes from user to user, for example, the gesture classifier performed at nearly 100% based on hand motions of SU5 and SU9 yet only performed nearly 92% based on hand motions of NU2. A designer of the gesture classifier can set a target precision value 702 (e.g., 95%) as a performance goal, such that the gesture classifier correctly classifies 95% of the training samples (i.e., gesture samples input to the gesture classifier during the training procedure). The training samples from a set of training data can be the data collected from various users (SU1-SU9 and NU1-NU6), such as in the case when the designer expects the gesture classifier to operate in a non-personalized manner. The training samples from a set of training data can be data collected from one specific user, such as in the case when the designer expects the gesture classifier to operate in a personalized manner with a classifier model customized to the one specific user.

Figure 8:
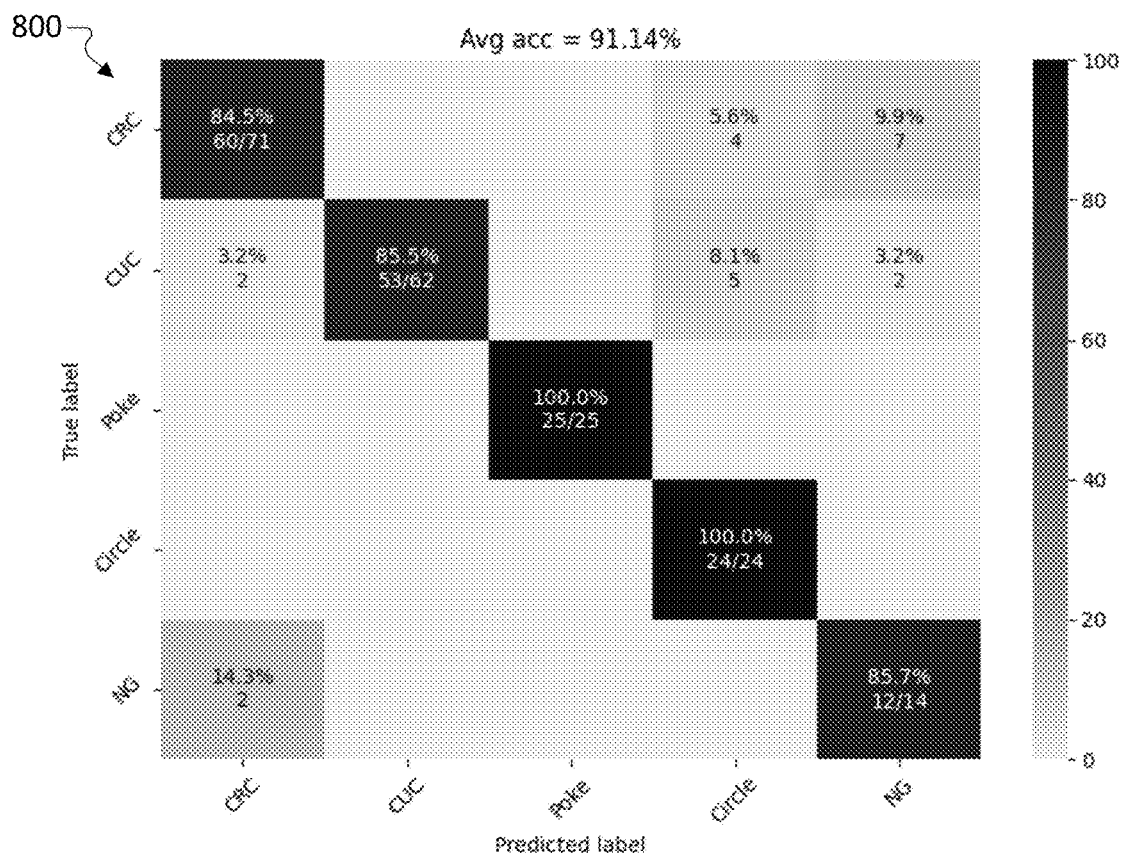
FIG. 8 illustrates a confusion matrix for one user in accordance with an embodiment of this disclosure.

FIG. 8 illustrates a confusion matrix 800 for one user in accordance with an embodiment of this disclosure. Each row represents a true label for each of the gestures 610-640 in the gesture vocabulary that the user performed during experimental trials and a non-gesture (NG) classification, as shown along the y-axis. Each column represents a predicted label that the gesture classifier output when the user performed during experimental trials. For example, the cell in the CRC row and CRC column (row 1 and column 1) shows that the gesture classifier output indicated the CRC gesture 610 sixty (60) times from among the seventy-one (71) times that the user performed the CRC gesture 610, and that the performance of gesture classifier for the CRC gesture 610 was 84.5% accuracy for the one user. Correspondingly, the error rate of the gesture classifier for the CRC gesture is 15.5% (i.e., the 84.5% accuracy subtracted from 100% perfection). As another example in the CRC row, the cell in the Circle column (column 4) shows that the gesture classifier output indicated the circle gesture 640 four (4) times when the user actually performed the CRC gesture 610, and that the gesture classifier inaccurately confused the CRC gesture 610 for the circle gesture 640 in 5.6% among the 71 times. As a last example in the CRC row, the cell in the non-gesture column (column 5) shows that the gesture classifier output indicated the non-gesture seven (7) times when the user actually performed the CRC gesture 610, and that the gesture classifier inaccurately confused the CRC gesture 610 for the non-gesture in 9.9% among the 71 times. Confusion tends to happen for certain pairs only, as the cells without values indicate no confusion. The confusion matrix 800 shows that the average accuracy of the gesture classifier is 91.14%, which corresponds to an average error rate of 8.86% for the five classifications (i.e., 4 gesture types and NG). Embodiments of this disclosure provide techniques to reduce confusion and increase accuracy of the gesture classifier.

During the experimental trials, the hand motion of the user performed a particular gesture repeatedly and consecutively, but the corresponding prediction label that was output from the gesture classifier was incorrect consecutively for a certain number of iterations (for example, 2-3 incorrect outputs) before the gesture classifier finally output a correct prediction label. For example, if the user performed a CUC gesture at a first time, then the gesture outputs an incorrect prediction label (e.g., circle gesture), then the used again performed a CUC gesture at a second time and third time, yet again the gesture outputs two more incorrect prediction labels (e.g., CRC gesture or circle gesture). When the user performed the circle gesture a fourth time, and the gesture classifier finally output the CUC as the correct prediction label, then the user stopped performing any more gestures. Embodiments of this disclosure provide techniques to detect such a temporal correlation of a bad event and to increase accuracy the gesture classifier.

Figure 9A:
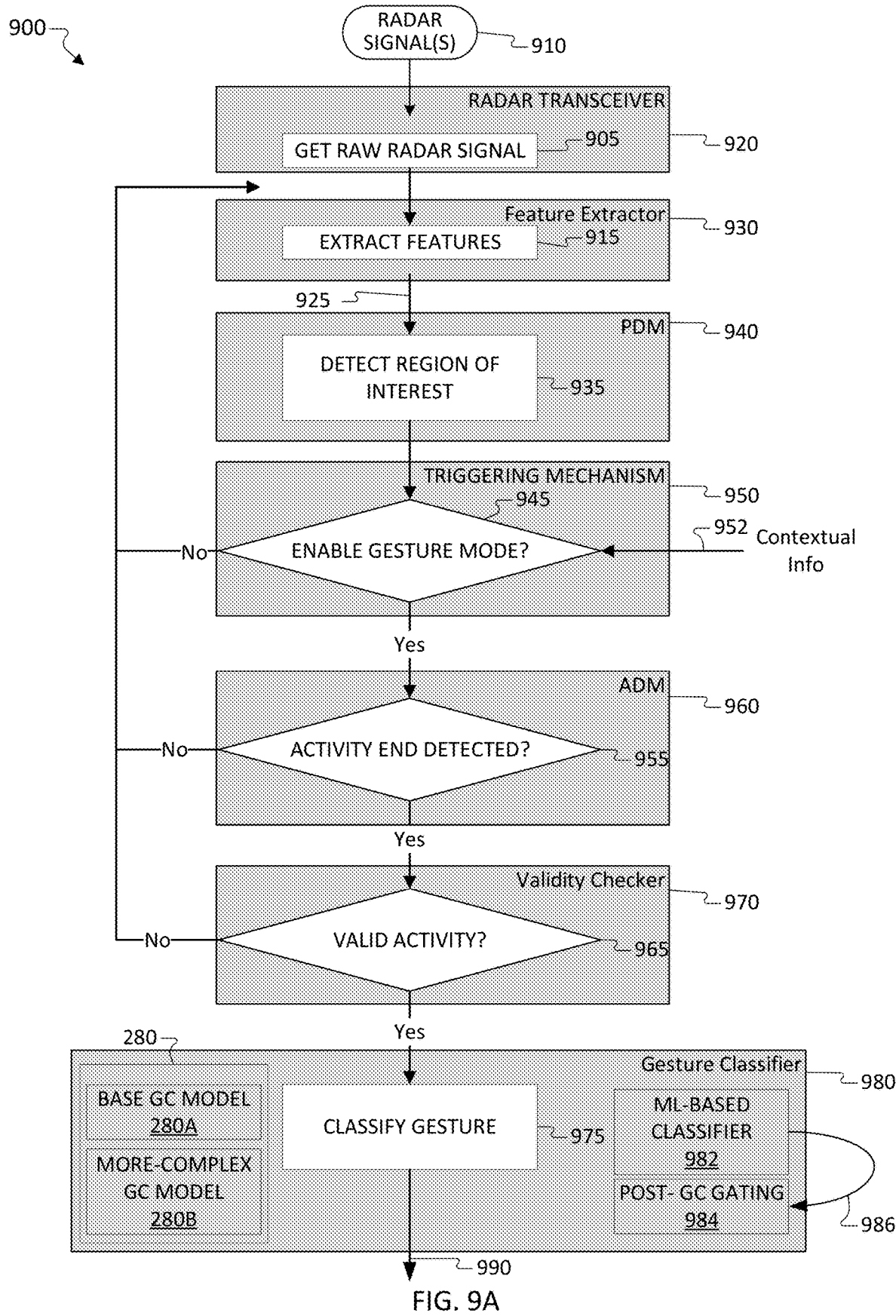
FIG. 9A illustrates a radar-based end-to-end gesture recognition system (GRS) in accordance with an embodiment of this disclosure.
Figure 9B:
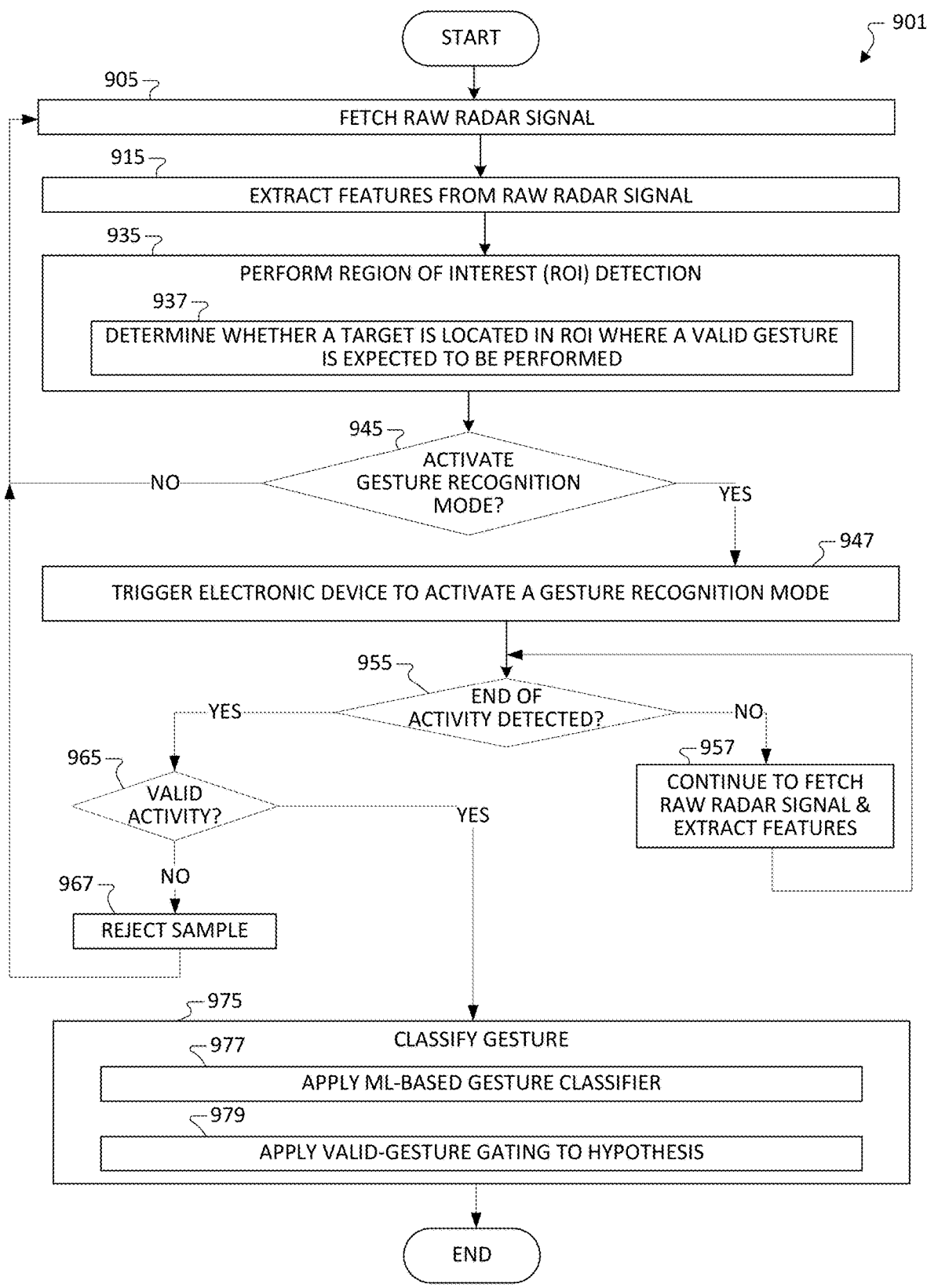
FIG. 9B illustrates a method for end-to-end dynamic gesture recognition performed by the GRS of FIG. 9A, in accordance with an embodiment of this disclosure.

FIG. 9A illustrates a radar-based end-to-end gesture recognition system (GRS) 900 in accordance with an embodiment of this disclosure. The GRS 900 of FIG. 9A can be an application, can be the same as the GRS 900 of FIG. 2. The embodiment of the GRS 900 shown in FIG. 9A is for illustration only, and other embodiments can be used without departing from the scope of this disclosure. Radar signals 910 are received (e.g., detected) as input to the GRS 900. The processing pipeline within the GRS 900 includes the radar transceiver 920, feature extractor 930, a proximity detection module (PDM) 940, a gesture mode triggering mechanism 950, an activity detection module (ADM) 960, a validity checker 970, and a gesture classifier (GC) 980 that includes the gesture vocabulary 600 (FIG. 6). The GC 980 includes a machine learning based (ML-based) classifier 982. In some embodiments, the GC 980 includes a post-GC gating module (referred to as valid-gesture gating module) 984 that receives a prediction output 986 from the ML-based classifier 982 and determines whether to output the prediction output 986 as the final output 990 from the GC 980. The components of the GRS 900 are used to perform the method 901 of FIG. 9B; and some parts of the method 901 described further below with FIG. 9B are also shown in FIG. 9A in an abbreviated format. The output from the GRS 900 includes or can be the same as the output 990 from the GC 980. For example, the output 990 from the GC 980 can be stored as the GC prediction 265.

FIG. 9B illustrates a method 901 for end-to-end dynamic gesture recognition performed by the GRS 900 of FIG. 9A, in accordance with an embodiment of this disclosure. The embodiment of the method 901 shown in FIG. 9B is for illustration only, and other embodiments could be used without departing from the scope of this disclosure. The method 901 could be performed by a processor 240 of the electronic device 200 executing the GRS 900, as described below.

The method 901 includes obtaining radar data, which can include raw radar data and extracted features that have been extracted from the raw radar data. At block 905, radar signals 910 are fetched from the radar transceiver 920. The radar signals 910 can be raw radar signals or can include pre-processed radar signals. The first step after fetching the raw radar signal is radar processing to extract relevant features.

At block 915, the feature extractor 930 extracts features from the radar signals 910. Radar processing to extract relevant features can include: clutter removals to remove unwanted reflections from the surrounding environment (anything not originating from the hand maybe considered as clutter); and processing to extract target information. Target information is information about the desired target object (e.g., finger or hand) and can include the target's range, Doppler, and angle. The extracted features include of TVD, time angle data (TAD), TED, or other features, such as shown in FIG. 5B. Further, target detection results may be accumulated together to form a time diagram, such as the time-velocity diagram and time-angle (azimuth or elevation) diagram etc. Such a two-dimensional time diagram may be used as the input to the gesture classifier 980 in the last stage of the GRS 900. In this disclosure, the term "sample" refers to a single trial of one activity which may be a gesture or a non-gesture, and a "gesture sample" 925 is the radar data (raw and/or extracted features) corresponding to the sample. The gesture sample 925 can be the same as the gesture sample 264 of FIG. 2.

At block 935, region of interest (ROI) detection is performed by a proximity detection module 940, which includes a proximity sensor (e.g., among sensors 275 of FIG. 2). As part of performing ROI detection, the proximity detection module 940 identifies the distance from the electronic device to the location of a target object (e.g., hand or finger of the user) where the gesture is being performed. At block 937, the proximity detection module 940 determines whether the target object is located in the ROI where a valid gesture is expected to be performed. For example, the target object 408 (FIG. 4) is determined to be inside the ROI when the distance 412 from the electronic device to the location of the object 408 is within the first area 120 (FIG. 1) and outside of the second area 122.

In some embodiments, the GRS 900 can operate in two modes: region of interest detection mode and gesture detection mode. During the ROI detection mode, a less costly radar configuration (in terms of radar transmission duty cycle and/or computational load) may be used by the proximity detection module 940. During this ROI detection mode, the radar processing may try to detect if there is a target object within the ROI where a valid gesture is expected. In case the electronic device is a mobile device, this ROI might be defined as within some distance (e.g., like 30 centimeters) from the mobile device in a boresight region (e.g., within a range of angles [−45°, +45°] from the boresight) of the radar. Then, when a target (e.g., a hand) is detected to be within the ROI, and another determination is made about whether target information meets one or more additional conditions to switch the GRS 900 to operate in the gesture detection mode.

At block 945, a determination is made about whether to activate the gesture detection mode of the GRS 900. The gesture detection mode is activated by a trigger and can be in an ON state or an OFF state. The gesture mode triggering mechanism 950 triggers the gesture detection mode, controlling whether the gesture detection mode of the GRS 900 is in the ON or OFF state. The gesture mode triggering mechanism 950 can apply multiple methods of triggering, for example by applying application-based triggering or proximity-based triggering. In the case of applying proximity-based triggering, the gesture detection mode is activated when an object in close proximity to the radar is detected in the ROI, such as when the gesture mode triggering mechanism 950 receives an indicator from the proximity detection module 940 indicating the target object is inside the ROI. The gesture mode triggering mechanism 950 puts or maintains the gesture detection mode in the OFF state if the user (i.e., target object) is located outside of the ROI. In certain embodiments, to save power and avoid using the gesture mode when the user is likely performing a touchscreen gesture as opposed to an in-air gesture, the gesture mode triggering mechanism 950 puts the gesture detection mode in the ON state in response to a determination that the user is located inside the ROI, but turns OFF the gesture detection mode when the user is located inside the second area 122. A benefit of activating the gesture detection mode based on proximity detection comes in reduced power consumption. The method 901 proceeds to block 947 to switch the gesture detection mode to the ON state, in response to a determination to activate the gesture detection mode.

The gesture mode triggering mechanism 950 contributes to robustifying the gesture classifier by utilizing the contextual information 952 (also referred to as side information). As part of performing methods of triggering, the gesture mode triggering mechanism 950 can receive and utilize contextual information 952 available on the electronic device to determine whether one or more additional conditions are satisfied to switch the GRS 900 to operate in the gesture detection mode. Examples of the additional conditions include a speed-related condition, a prominent presence condition (such as the target object appearing in the ROI for a certain amount of time), etc. In the case of application-based triggering, the additional conditions include a simple example in which only certain applications 272 allow gesture input, and in such a case, contextual information 952 includes which among the applications 262 is the active application. If the active application is not within the list of applications supporting gesture input, then the gesture mode triggering mechanism 950 does not enable or activate the gesture detection mode. The method 901 ends or restarts at block 905, in response to a determination to not activate the gesture detection mode.

At block 955, while the gesture detection mode is activated, the ADM 960 operates to determine or detect an end to an activity (e.g., end of a trial). This ADM 960 has a capability and is designed to reject unrelated motions (referred to as non-gesture or NG), but the main functionality of the ADM 960 is to detect any gesture end. The ADM 960 could be based on a rules-based signal processing algorithm, the ADM 960 could use an ML-based solution, or the ADM 960 could use a combination of both approaches to detect an end of activity (e.g., motion of a gesture). In any case, information related to the signal strength, Doppler (i.e., speed) of the target, range of the targets, etc. could be extracted features used as the input for the detection performed by the ADM 960. Further, an activity end may also be detected by certain special events, such as an event that the target exits the ROI. In response to a determination that no end of activity is detected, the ADM 960 determines that motion of the target object continues, and the method proceeds to block 957 to continue accumulating radar data into the same gesture sample 925. At block 957, the GRS 900 continues to fetch raw radar signals and to extract features. The procedure performed at block 957 can be the same procedures performed at blocks 905-915. The gesture sample 925 can include radar data collected over multiple radar frames, consecutively. Alternatively, in response to a determination that an end of activity is detected, the method proceeds to block 965 to trigger the validity checker 970 to operate.

Just because the ADM 906 detects an end of a motion (i.e., triggers a detection by the ADM) does not necessarily mean that a gesture has been performed. A false alarm occurs when an end of motion that the ADM 960 detects as an end of a gesture is later determined (by the validity checker 970 or gesture classifier 980) to be an end of motion that is not a valid gesture (i., non-gesture). To reduce false alarms at block 965, the GRS 900 includes the validity checker 970 to check the validity of the activity within the gesture sample 925. As such, the validity checker 970 determines whether it is plausible that this activity in the gesture sample 925 could be a valid gesture. The validity checker 970 filters out NG samples that may pass through the ADM 960, as such, the validity checker 970 applies post-ADM gating. The validity checker 970 could be a signal processing algorithm or an ML-based pattern recognition solution that can identify and reject NG samples. In an embodiment of the validity checker 970, some statistical summaries are extracted from the gestures among the collected dataset of pre-existing validated gesture samples 267. Examples of the statistical summaries extracted include radar detection parameters, such as: range (i.e., distance) variation, Doppler (speed), angle variation, duration of the activity, etc. Any detected activity that does not fall within the empirical distribution derived in these statistical summaries could be considered as outliers. The validity checker 970 rejects the outliers as NG, at block 967. The method 901 ends or restarts at block 905, after the gesture sample 925 is rejected at block 967. The affirmative arrow from block 965 to 975 illustrates that if the gesture sample 925 satisfies the post-ADM gating conditions within the validity checker 970, then a gesture sample 925 (e.g., an activity) is valid and is next processed by the gesture classifier 980.

Finally, at block 975, the gesture classifier 980 is triggered to operate by an indication from the validity checker 970 indicating that the gesture sample 925 is valid; the validated gesture is classified by the gesture classifier 980 and output back to the system/application (e.g., tuner 263 of FIG. 2). Depending on the associated action in the system/application, the method 901 can return to the first block 905 and monitor for the next gesture.

At block 977, to classify the gesture, the gesture classifier 980 applies the ML-based GC 982 to process the gesture sample 925. Within the gesture classifier 980, the ML-based gesture classifier 982 can include a neural network (for example, a convolutional neural network (CNN) or Long Short Term Memory (LSTM) neural network), or transformer-based architectures, or a classical ML-based classifier algorithm (for example, support vector machines (SVM) algorithm, random forest algorithm, etc.). In a first embodiment of the GC 980, the ML-based GC 982 generates a prediction output 986 that is used as a hypothesis of which type of gesture the activity of the gesture sample 925 is from among the gesture vocabulary 600. The prediction output 986 can include four probabilities ($\hat{y}_0$ through $\hat{y}_3$) corresponding to the four gestures in the gesture vocabulary 600. Each probability within the prediction output 986 indicates the likelihood that the user performed the corresponding gesture. For example, a first probability $\hat{y}_0$ represents the likelihood that the user performed a CRC swipe gesture 610, and the fourth probability $\hat{y}_3$ represents the likelihood that the user performed a circle gesture 640. The greatest probability value among the among four probabilities ($\hat{y}_0$ through $\hat{y}_3$) represents the type of gesture that the gesture sample 925 is classified as by the ML-based GC 982. The hypothesis is the type of gesture corresponding to the greatest probability value among $\hat{y}_0$ through $\hat{y}_3$.

In a second embodiment of the GC 980, the valid-gesture gating module 984 is not used, and the prediction output 986 is output by the GRS 900 as the final output 990 from the GC 980. In this second embodiment of the GC 980, the ML-based GC 982 has the capability to reject non-gestures. As such, the prediction output 986 can include five probabilities ($\hat{y}_0$ through $\hat{y}_4$) corresponding to the four gestures in the gesture vocabulary 600, and a fifth probability $\hat{y}_4$ represents the likelihood that the motion activity of the user is non-gesture. However, it is understood that the valid gesture gating module 984 can be used to receive the prediction output 986 and determine whether to output the prediction output 986 as the final output 990 from the GC 980, in both embodiments in which the prediction output 986 does not include the non-gesture class (e.g., fifth probability $\hat{y}_4$) and in embodiments which the prediction output 986 does include the non-gesture class.

At block 979, within the first embodiment of the gesture classifier 980, the valid-gesture gating module 984 receives the prediction output 986 as a hypothesis and applies valid-gesture gating to process the hypothesis. The valid-gesture gating is stricter gating than the post-ADM gating, in that the valid-gesture gating module 984 extracts statistical summaries from a subset of the dataset of pre-existing validated gesture samples 267 that have a specified gesture type, which is the same gesture type as the hypothesis. That is, the valid-gesture gating enables tighter vetting because the statistical summary to be used is derived only from the same gesture type as the hypothesis, rather than derived all the gesture types in the supported gesture vocabulary 600. Any validated gesture 925 that does not fall within the empirical distribution derived in these statistical summaries could be considered as outliers. The valid-gesture gating module 984 rejects the outliers as NG, at block 979.

The method 901 ends or restarts at block 905, after a validated gesture sample 925 is rejected at block 979. The arrow from block 975 to end block illustrates that if the validated gesture sample 925 satisfies the post-GC/valid gesture gating conditions within the valid-gesture gating module 984, then valid-gesture gating module 984 determines that the prediction output 986 is the output from the GRS 900 as the final output 990 from the GC 980.

At the end of the method 901, the GRS 900 outputs the validated gesture sample 925 (e.g., validated activity) and the corresponding output 990 from the GC 980. The output from the GRS 900 can be input block 1010 of FIG. 10.

Figure 10:
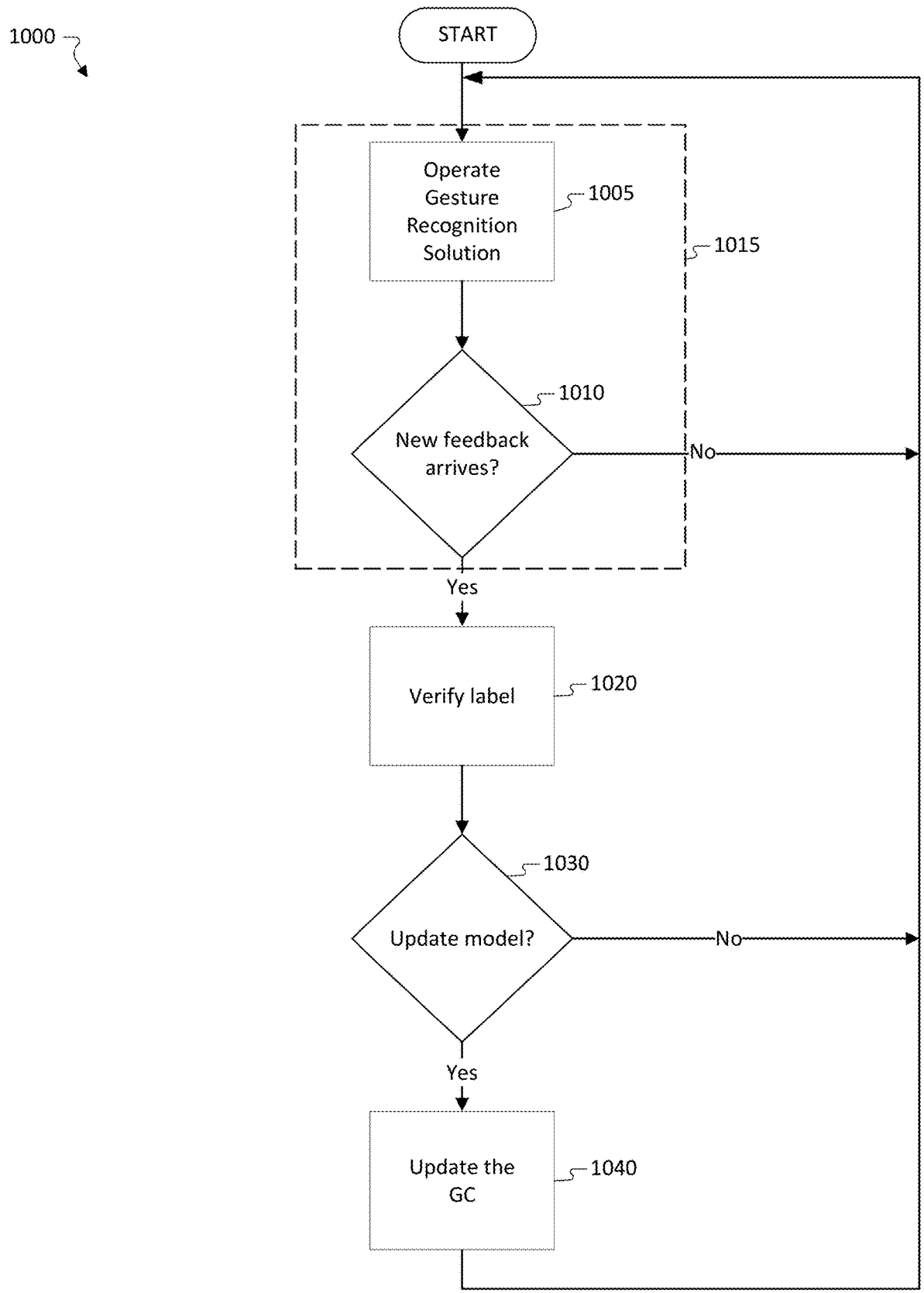
FIG. 10 illustrates a method for robustifying performance of a gesture classifier based on gesture samples collected to update the gesture classifier to personalize the classifier model according to the user of an electronic device, in accordance with an embodiment of this disclosure.

FIG. 10 illustrates a method 1000 for robustifying performance of a gesture classifier based on gesture samples collected to update the gesture classifier 980 to personalize the classifier model 280 according to the user of an electronic device, in accordance with an embodiment of this disclosure. The embodiment of the method 1000 shown in FIG. 10 is for illustration only, and other embodiments could be used without departing from the scope of this disclosure. The method 1000 could be performed by a processor 240 of the electronic device 200 executing the tuner 263, as described below.

The method 1000 starts at block 1005, at which the GRS 900 (FIG. 9A) operates, executing the method 901 (FIG. 9B) for end-to-end dynamic gesture recognition. More particularly, the tuner 263 calls the GRS 900 to operate. The tuner 263 obtains the output from the GRS 900, which includes a validated gestures sample 925 and the GC output 990 that corresponds to (e.g., is related to, linked to, or associated with) the validated gesture sample 925. The term "target gesture" refers to the type of gesture that the final GC output 990 specifies, which is the same as the type of gesture that the gesture sample 925 is classified by the ML-based GC 982. The target gesture is used in other portions of the method 1000 to avoid (e.g., filter out) data associated with other types of gestures among the gesture vocabulary 600, thereby enabling targeting of the data related to the target gesture.

At block 1010, the tuner determines whether feedback is obtained by (e.g., generated by, or received as input to) the tuner 263. In response to a determination that feedback is not obtained by the tuner 263, the method 1000 ends and restarts, as illustrated by the NO arrow. In response to a determination that the tuner 263 obtained feedback that corresponds to the obtained gesture sample, the method 1000 proceeds to block 1020, as illustrated by the YES arrow.

At block 1010, the tuner 263 performs a sample collection procedure. Block 1015 includes blocks 1005 and 1010. Within block 1015, the tuner 263 not only obtains a validated gesture sample 925 and the target gesture corresponding to the validated gesture sample 925 (as shown at block 1005), but also can obtain feedback that corresponds to the gesture sample 925, and then determine (as shown at block 1010) the feedback has been obtained.

The feedback includes a label indicating a type of gesture (from among the gesture vocabulary 600) that the tuner 263 selected to correspond to the gesture sample 925. The feedback obtained can be implicit feedback or explicit feedback. For example, explicit feedback is user input selecting the type of gesture to be used as a label corresponding to the gesture sample 925, and the explicit feedback indicates the user's belief about type of gesture that the user performed. As another example, implicit feedback is determined by the tuner 263, automatically selecting the label in part based on other data (e.g., dataset 267, distance threshold 268, and/or dataset 269), without asking for user input to select a label indicating the user's belief.

To collect explicit feedback, the tuner 263 executes a process to determine when to request a feedback for a particular target gesture. As a comparison of the explicit versus implicit sample collection procedures, to collect implicit feedback, the tuner 263 waits for an opportunity when a certain situation happens (or a set of conditions are satisfied) for the particular target gesture. When detection of such an opportunity happens, a new gesture sample with feedback (i.e., the label indicating which gesture type the gesture sample is) is available and collected by the tuner 263.

The sample collection procedure (either implicit or explicit) of block 1015 is not free from errors or can occasionally be erroneous. To reduce errors at block 1020, the tuner 263 verifies the label that is within the (implicit or explicit) feedback. The tuner 263 determines that the label is verified if the gesture sample 925 satisfies a motion similarity condition that is defined by a distance metric, for example, the gesture sample 925 being within the distance threshold 268 from the dataset of pre-existing validated gesture samples 267. The labels (with the associated gesture sample 925) that pass this verification are flagged or collected to be considered as valid training samples.

At block 1030, the tuner 263 determines whether to update the GC model 280. This determination can be based on the amount of newly collected training samples, for example, the tuner 263 can determine to update the GC model 280 when the number of newly collected samples exceeds a threshold. In response to a determination to not update the model 280, the method 1000 ends and restarts, as illustrated by the NO arrow. In response to a determination to update the model 280, the method 1000 proceeds to block 1040 to update (or robustify) the model 280 of the gesture classifier 980, as illustrated by the YES arrow.

At block 1040, the tuner updates (i.e., tunes) the GC model 280. To update the GC model 280, the tuner 263 can use any suitable machine learning approaches for personalization, such as transfer learning, domain adaptation, or few-shot learning. During this process of tuning the GC model 280, some or all of the old data used to train the previous model (for example, original model) could be used along with the newly collected gesture samples. Once the model is updated at block 1040, the method 1000 ends and then restarts using the updated model.

Although FIG. 10 illustrates an example method 1000 for robustifying performance of a gesture classifier based on gesture samples collected to update the gesture classifier 980 to personalize the classifier model 280 according to the user of an electronic device, various changes may be made to FIG. 10. For example, this disclosure provides multiple techniques that use the contextual information 952 differently for robustifying performance of a gesture classifier. The first technique is robustification by personalization of the GC 980 using explicit and implicit feedback from the user. The second technique is robustification by optimizing radar parameter choices and gesture classifier choices according to contextual information 952. The third technique is robustification by optimizing operation according to contextual information 952. One or a combination of these techniques could be used. The contextual information 952 are described further below, followed by a detailed description of the embodiments for each of the three techniques.

According to embodiments of this disclosure, robustification of the gesture classifier utilizes the contextual information 952 for customization in a domain. The contextual information 952 can be divided into three groups: contextual information about the user; contextual information about the environment; and contextual information about the usage (real-time usage or statistical usage over time). The three techniques for robustification may use just one or some combination of the three types of context information. Contextual information about the user is used by the GC 980 and includes information related to the radar features of the user's gestures. Contextual information about the user includes geometry of the hand or fingers of the user (e.g., shape of, size of, or jewelry on the user's hand/fingers), and how a particular user performs the gestures in the vocabulary. For example, the users SU5 and SU6 may repeatedly perform a circle gesture differently than each other, and the contextual information about the user SU5 will be different from that for the user SU6 in order for robustification to reduce differences of average precision of a gesture classifier graphed in FIG. 7.

Contextual information about the environment in which the radar transceiver module operates can be information obtained via sensors (including the radar transceiver 270 and sensors 275) available on the electronic device 200. Contextual information about the environment includes the level of clutter (unwanted radar reflections) in the operating environment, the types and frequency of non-gesture motions to be expected in the current environment. The radar parameters and/or the gesture classifier model may be selected for optimal performance based on the contextual information about the environment.

Contextual information about the usage of the GRS 900 enables usage patterns to be identified and includes those usage patterns identified. The usage patterns provide prior probability distribution for the associated actions. As an example, when the associated actions in an application are not uniformly used (some actions are used more frequently, and some actions are used less frequently), then the prior probability distribution can be useful. For example, in a multimedia player application among the applications 262, a circle gesture 640 corresponding to a rewind-15-seconds action may be used less frequently than a poke gesture 630 corresponding to a play/pause action. The frequencies of occurrences of each gesture type in the gesture vocabulary 600 may be different for different applications because the actions (in the application) associated with the gesture types are not uniformly used in the different applications, respectively. For example, if the circle gesture 640 corresponds to a rewind-15-seconds action in a multimedia player application and corresponds to a redial action in a phone calling application, then the circle gesture 640 may be used more frequently in the multimedia player application than in the phone calling application (in case the user rewinds more often than redials). In other cases, a certain sequence of actions (and corresponding sequence of gestures) could be considered atypical. For example, in the case of a multimedia player control application, a sequence of play then pause actions repeated continuously would be abnormal operation (especially in a brief window of time, such as 2-5 seconds), yet adjusting the volume repeatedly is a normal operation, even in a brief window of time. As such, when a sequence of play/pause operations repeated consecutively are detected by the GRS 900, the tuner 263 can determine that the gesture classifier 980 performed incorrect classification or can determine that the consecutively repeated sequence includes a potentially misclassified sample. To reduce the problem of an incorrect classification, the tuner 263 can perform methods to identify and further analyze a potentially misclassified sample to determine whether an incorrect classification occurred or did not occur.

One way to personalize the gesture classifier 980 is to present a request for the user's personalized data at the beginning of service at a setup time. This approach, however, could be inadequate or even be disadvantageous for gesture recognition, especially if there is no further adaptation in a later stage. This disadvantage can occur because how the user performs the gestures could evolve over time, as the user becomes more familiar with the gestures. Some users may feel a bit awkward to perform the gestures for the first few times, but after a bit of practice, the user may have made some adjustments that make the user feel more natural (i.e., less awkward) performing the gestures. In such a situation, if the tuner 263 collected samples at the start of the service at the setup time only, then those awkward gesture samples would be collected and would not represent the evolved gestures that the user performs after the user settles on how the user would perform the gestures feeling more natural. For these reasons, embodiments of this disclosure do not limit the collection of gesture samples to a setup time when the user starts using the tuner 263 and GRS 900. Instead, over time, embodiments of the tuner 263 of this disclosure keeps collecting samples during the operations so that a drift or adjustment in how the user performs the gestures could be captured if the drift happens.

The first technique of robustification by personalization of the GC 980 uses explicit and implicit feedback from the user, in accordance with embodiments of this disclosure. Refer back to the sample collection procedure at block 1015 of FIG. 10. The tuner 263 collects samples from the users during the operation of the GRS 900 in such a way that the collection action does not cause too much disruption to the user experience. That is, the tuner 263 balances user experience versus accuracy of the gesture classifier. The tuner 263 is able to collect samples from the users in both explicit and implicit ways. In the explicit approach, tuner 263 asks the user to confirm the conducted gesture (either directly or indirectly). In the implicit approach, the tuner 263 analyzes (e.g., exploits) opportunistic situations to infer which gesture type was performed by the user and uses the inferred gesture type as a label for the gesture sample. Additional details of the sample collection procedure are provided in FIG. 11 and FIG. 12A for the explicit feedback and implicit feedback approaches, respectively.

To reduce the amount of data to be collected, the tuner 263 can be configured with proper gesture vocabulary selection, as confusion matrix 800 indicates that the gesture vocabulary 600 usually includes only one or two pairs of gesture types that tend to be confused with each other and dominate the overall accuracy of the gesture classifier. In some embodiments, for the explicit approach, the tuner 263 is designed to request feedback for only those pairs particularly vulnerable to be confused with each other. As a technical advantage, the tuner 263 reduces consumption of memory resources by collecting samples for only a subset of the gesture vocabulary 600. As the gesture samples are collected during the normal operation of the GRS 900, the samples are collected opportunistically, and not in a consecutive manner, and this opportunistic collection is less intrusive to the user experience than consecutively collecting samples regardless of tendency to be confused with each other.

Figure 11:
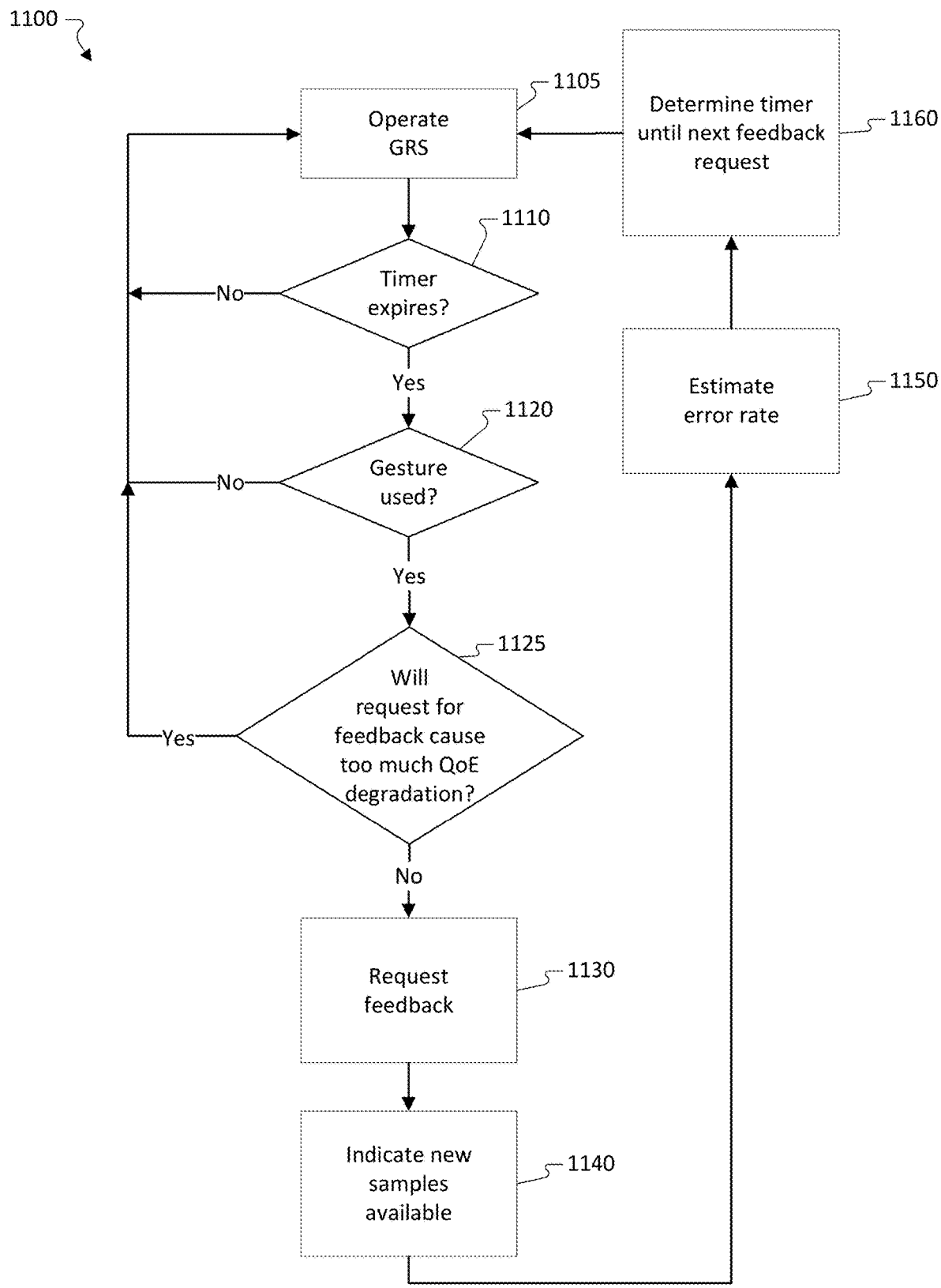
FIG. 11 illustrates a method 1100 for requesting a user to input explicit feedback for obtaining labeled training data for tuning the gesture classifier model, in accordance with an embodiment of this disclosure.

FIG. 11 illustrates a method 1100 for requesting a user to input explicit feedback for obtaining labeled training data for tuning the gesture classifier model, in accordance with an embodiment of this disclosure. The embodiment of the method 1100 shown in FIG. 11 is for illustration only, and other embodiments could be used without departing from the scope of this disclosure. The method 1100 could be performed by a processor 240 of the electronic device 200 executing the tuner 263, as described below.

The method 1100 is described as executed for the target gesture (i.e., a particular gesture type, or gesture of interest), and the various other gesture types in the gesture vocabulary 600 could be used depending on the level of weakness of the gesture classifier 980. The level of weakness of the gesture classifier 980 depends on which gesture types are more likely to be confused with the target gesture type. The level of weakness can be measured by the error rate of the GC 980, which is the likelihood that the final output 990 from the GC 980 is incorrect. The GC 980 can have different error rates, including a general error rate calculated based on all gestures in the gesture vocabulary, and including a specific error rate for each respective type of gesture. In some embodiments, the sample collection procedure is performed in proportion to the error rate of the GC 980, and the collected samples can be later used to reduce the level of weakness of the GC 980, thereby robustifying the gesture classifier 980.

The method 1100 begins at block 1105, at which the tuner 263 performs the same procedure performed at block 1005 of FIG. 10. At block 1110, the tuner 263 determines whether a timer has expired. The timer has timer duration T to control the interval between requests for explicit feedback. If the timer is not expired, the method 1100 returns to block 1105 to continue operating the GRS 900 to accumulate incoming radar data into the gesture sample 925. If the timer is expired, the method proceeds to block 1120. At block 1120, the tuner 263 determines whether a particular gesture is used. More particularly, the tuner 263 determines whether the target gesture is used. If the target gesture is not used, the method 1100 returns to block 1105 to continue operating the GRS 900 to accumulate incoming radar data into the gesture sample 925. If the target gesture is used, the method proceeds to block 1130.

At block 1130, feedback is requested. More particularly, the tuner 263 requests explicit feedback from the user. There are several options for conducting the request for explicit feedback. One example option is requesting and receiving explicit feedback via other interfaces than gesture recognition. For example, if a GUI is the interface, then once the target gesture (or its likely confused gesture types) is predicted, a confirmation dialog box would pop up asking the user to confirm which type of gesture the user performed. Similarly, if the interface is a voice interface, the user may be asked to provide voice input that confirms which gesture the user performed.

Another example option is requesting and receive explicit feedback via the GRS 900 as an interface aided by a conventional interface (e.g., GUI or voice interface). In this option, while a conventional interface can still be used for providing the request for explicit feedback, but the conventional interface might not be appropriate for receiving the feedback that the user inputs. In this case, the GRS 900 could be used but with a smaller subset of the gesture vocabulary 600. More concretely, the conventional interface can ask the user to confirm if the user conducted a circle gesture, and the user is given an option to confirm by a swipe left gesture or otherwise deny by a swipe right gesture. In this example, the method 1100 is based on an assumption that the swipe left and swipe right gestures can be classified with very high accuracy by the GRS 900, and that the gesture vocabulary includes the swipe left and swipe right gestures.

As yet another option, rather than asking the user to confirm the gesture directly, the request for explicit feedback can instead simply ask the user to confirm the associated actions in the application. While this option has an equivalent outcome, some users may feel different about this option, and the option might appear more natural to some other users.

At block 1140, an indicator is generated to indicate that new samples are available to be used as training samples. At block 1150, the tuner 263 estimates the error rate of the gesture classifier.

At block 1160, the tuner 263 determines a timer until the next request for feedback. For example, the tuner 263 resets the timer that was utilized at block 1110. After determining the timer duration T, the tuner 263 waits until the timer expires. Once the timer expires at block 1110, the method 1100 can proceed to requesting explicit feedback from the user at the first opportunity when the final output 990 from the GC 980 indicates target gesture is used (or when one or more of the target gesture's frequently confused gestures are used).

In the method 1100, after a new sample is collected and the label associated with the newly collected sample is verified, the error rate corresponding to the label is updated. In this case, the label after the label verification process is completed is referred to as the true label. According to embodiments of this disclosure, a gesture sample 925 that corresponds to a wrong prediction output 986 is more valuable for improving the gesture classifier, for example, if the final output 990 from the gesture classifier 980 does not match the true label.

For controlling the sampling interval by the estimated error rate, a multi-arm bandit (MAB) framework could be used. For example, one simple way to control the sampling interval is to select a timer interval that is proportional to the estimated error rate. One caveat is that the error rate is estimated empirically, the accuracy of the error rate will be low when the number of samples is small. Embodiments of this disclosure account for this relationship between error rate accuracy and number of samples. More concretely, the timer duration T is set according to Equation 10, where $T_{ref}$ denotes the reference duration for requesting the feedback, $\mathcal{U}(a, b)$ denotes the uniform distribution between the interval (a,b), $\varepsilon$ denotes the estimated empirical error rate, a denotes the standard deviation of the error rate, n denotes the number of samples collected so far (used in this empirical error estimation), and $\alpha_{min}$ and $\alpha_{max}$ are parameters chosen so that the timer duration is not too short or too long. For example, the timer duration T is set such that efforts on the part of the user are small (e g, minimized) and such that the requests for explicit feedback are not presented too many times or too often.

$$\frac{T}{T_{ref}} \sim \mathcal{U}\left(\max\left(\varepsilon - \frac{\sigma}{\sqrt{n}}, \alpha_{min}\right), \min\left(\varepsilon + \frac{\sigma}{\sqrt{n}}, \alpha_{max}\right)\right) \quad (10)$$

Another to control the sampling interval includes the choice of a Poisson-gamma model (i.e., similar to the Thompson sampling method), where a gamma distribution is used as the conjugate prior on the Poisson distribution (which control the sampling timing). The gamma distribution is updated whenever a newly verified label is available. Any other variants that yield a similar effect as described in this disclosure may also be used.

Although FIG. 11 illustrates an example method 1100 for requesting a user to input explicit feedback for obtaining labeled training data for tuning the gesture classifier model, various changes may be made to FIG. 11. For example, the availability of the interface needed for providing the feedback is another criterion to be satisfied. The method 1100 can additionally include block 1125 to determine whether the active application has a feedback interface that is proper for obtaining explicit feedback from the user, and to determine whether a request for explicit feedback at the current moment will cause a quality of experience (QoE) issue, such as too much QoE degradation relative to requirements of the active application. The request for feedback is presented to the user at block 1130 in response to a determination that the active application has a proper feedback interface and that an interruption at the current moment will not cause the QoE issue. In some embodiments, user experience may carry more weight, and the method 1100 may allow the request for explicit feedback only for applications in which interruption is less problematic.

Figure 12A:
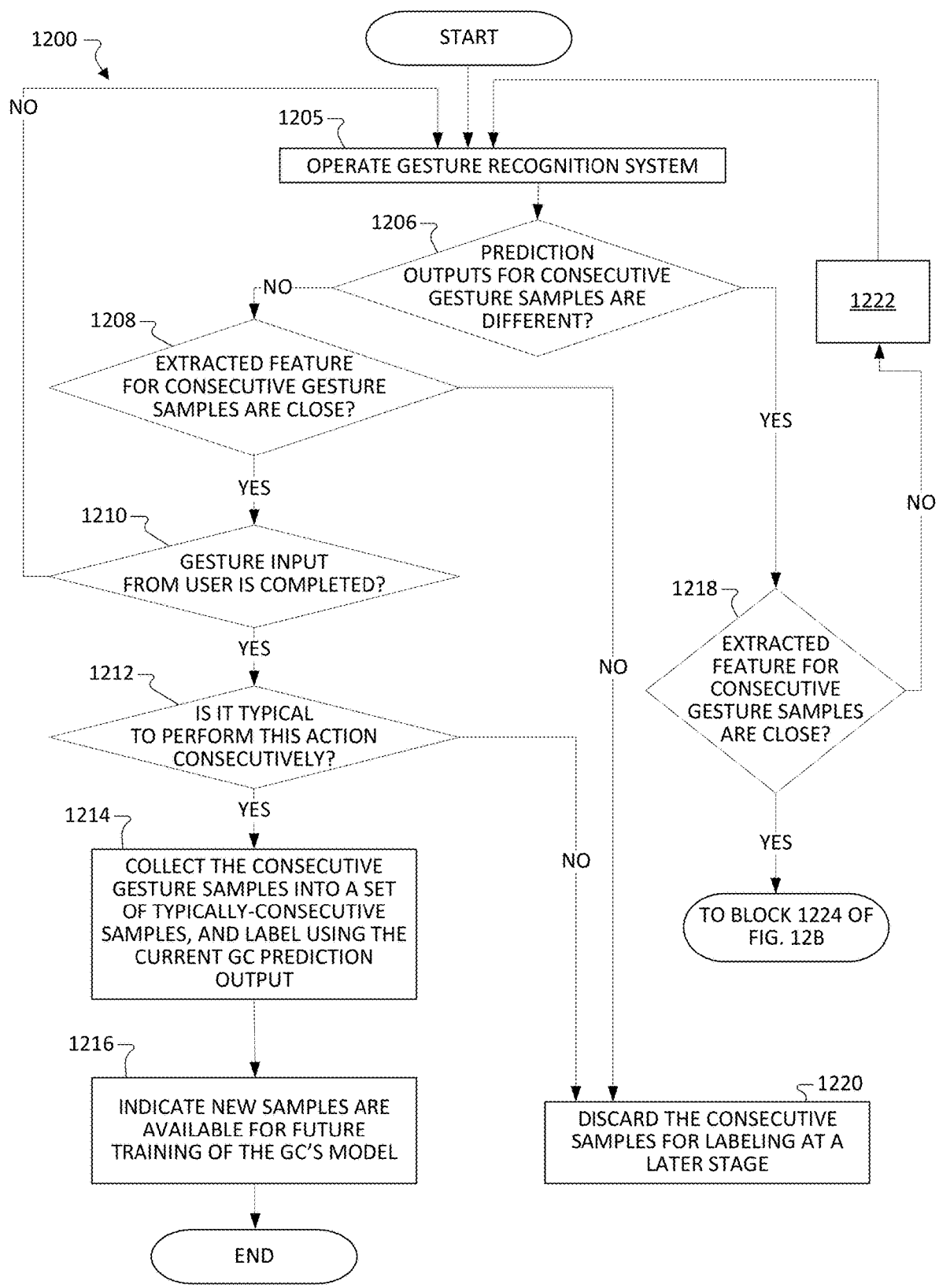
FIGS. 12A and 12B collectively illustrate a method 1200 for obtaining implicit feedback that includes gesture sample collection, in accordance with an embodiment of this disclosure.
Figure 12B:
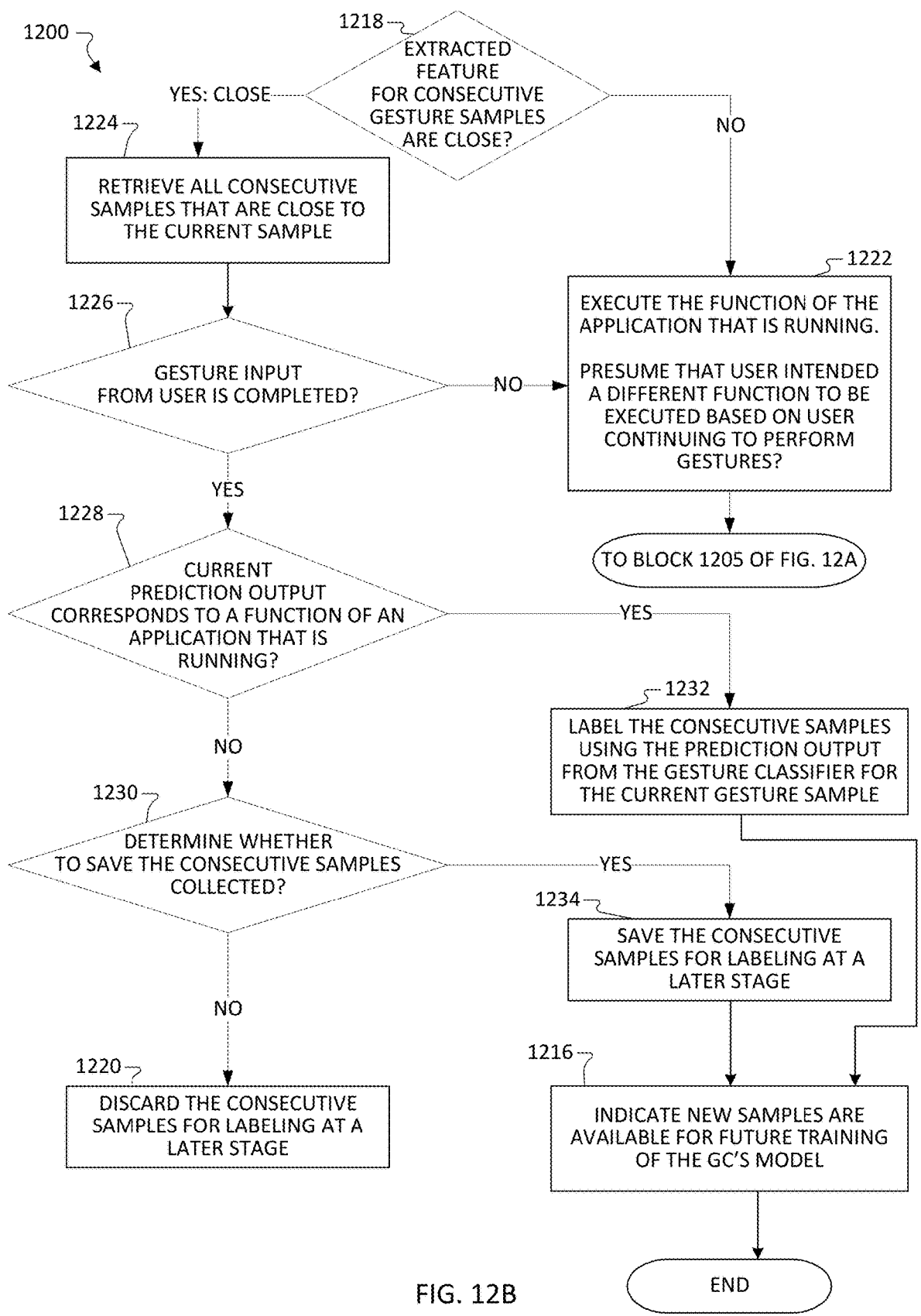

FIG. 12A and FIG. 12B are collectively referred to as FIG. 12. FIG. 12 illustrates a method 1200 for obtaining implicit feedback that includes gesture sample collection, in accordance with an embodiment of this disclosure. The embodiment of the method 1200 of FIG. 12 is for illustration only, and other embodiments could be user without departing from the scope of this disclosure.

Besides the explicit approach that requires some of the user's direct attention for inputting explicit feedback in some applications, embodiments of this disclosure enable the tuner 263 to implicitly determine a label for the gestures conducted based on a sequence of the gestures and the user's behavior. For example, the method 1100 can be used with a multimedia player application. Assuming the gesture of interest is a circle gesture, which is associated with the 'stop' action. In this case if the user keeps doing circle gestures, but the media player is still playing, then this is a situation in which the gesture classifier 980 is producing wrong predictions at the GC output 990. After a threshold number (k) of repetitions, the gesture classifier 980 correctly outputs a circle gesture, the media player stops, and then the user also stops inputting any more gestures. In this case, it could be inferred that these consecutive gestures were intended to be the circle gesture (i.e., for stopping the media player).

Another situation for the media player example is the volume up/down control. This is a situation where the gesture classifier may misclassify a volume-up gesture as non-gestures for k repetitions, after which the GC 980 correctly classifies the input motion activity (also referred to as gesture input) as the gesture type corresponding to volume-up. In this case, the user may continue to apply several more volume up controls until the user is satisfied with the setting, for example, the user may continue to consecutively perform the gesture type corresponding to the volume-up action.

These two situations with the media player are examples in which it is advantageous that the tuner 263 is designed to obtain implicit feedback by collecting user-specific samples according to the usage patterns. Here, an event of interest is when there is a change in the prediction output for two consecutive gesture samples with similar extracted features (e.g., their time-velocity and time-angle diagrams are close by a metric such as a distance metric). This event of interest is a good indication that the gesture classifier 980 might have produced wrong prediction. This usage pattern can be used to label those samples (collected as a set of consecutive gesture samples 284) for which the GC 980 might have produced wrong prediction.

As shown in FIG. 12A, the method 1200 starts at block 1205, at which the GRS 900 is operated. The procedure performed at block 1205 is the same as the procedure performed at block 1005 of FIG. 10, or at block 1105 of FIG. 11. The GRS 900 outputs a gesture sample 925 that has been validated as a representation of motion activity that could plausibly be a gesture from among the gesture vocabulary 600, and this validated gesture sample 925 can be temporarily stored as the current gesture sample 264. The output from the GRS 900 also includes the final output 990 from the gesture classifier 980, which can be temporarily stored as the GC prediction 265 and is related to the current gesture sample (925 or 264).

Table 1 shows consecutive outputs from the GRS 900 in two scenarios, Scenario 1 and Scenario 2. Each output from the GRS 900 includes a pairing of a gesture sample and a corresponding GC prediction, for example, the pairing (Samplet-2, Predictiont-2) output antepenultimately before the current gesture sample.

TABLE 1

|  | Previous Gesture Sample | Immediately Preceding Previous Gesture Sample | Current Gesture Sample |
| --- | --- | --- | --- |
| Name of Gesture Sample | Sample$_{t-2}$ | Sample$_{t-1}$ | Sample$_{t0}$ |
| Name of GC prediction | Prediction$_{t-2}$ | Prediction$_{t-1}$ | Prediction$_{t0}$ |
| Type of Gesture Classified in Scenario 1 | CUC swipe gesture 620 | CUC swipe gesture 620 | CUC swipe gesture 620 |
| Type of Gesture Classified in Scenario 2 | CUC swipe gesture 620 | CUC swipe gesture 620 | Circle gesture 640 |

At block 1206, the tuner 263 determines whether the GC prediction outputs for consecutive gesture samples are different. The consecutive gesture samples include the current gesture sample 264 and one or more previous gesture samples, and can be stored in memory as a set of consecutive gestures samples 282 collected. If the GC prediction outputs for the consecutive gesture samples are identical, for example in the case of Scenario 1 of Table 1, then the method 1200 proceeds to block 1208. The GC prediction outputs for the consecutive gesture samples 284 are different if the current GC prediction 265 corresponding to the current gesture sample 264 is different from the immediately preceding GC prediction corresponding to the immediately preceding gesture sample, such as in the case of Scenario 2 of Table 1. When a difference is determined at block 1206, the method 1200 proceeds to block 1218.

At block 1208, the tuner 263 determines if extracted features for the consecutive gesture samples 284 are close (i.e., similar). In response to an affirmative determination, the method 1200 proceeds to block 1210. In response to a negative determination, namely that the extracted features for the consecutive gesture samples 284 are not close (i.e., not similar), the method 1200 proceeds to block 1220 for discarding the consecutive samples.

At block 1210, in response to a determination the extracted features for the consecutive gesture samples 284 are close, the tuner 263 determines whether gesture input from the user is completed. For example, the tuner 263 determines whether operation of GRS 900 is completed. Operation of the GRS 900 is not completed if the user has restarted to perform a gesture as a new trial, which might occur if the current GC prediction 265 is wrong, or which might occur if the user intends to perform a sequence of gestures in quick succession. In response to a determination that gesture input from the user is not completed, the method 1200 returns to block 1205 to continue operating the GRS 900 to continue obtaining incoming gesture input. The tuner 263 can determine that gesture input from the user is completed based on ADM 960 being in an inactive state or an OFF state, or based on the PDM 940 indicating that the object is out-of-ROI (e.g., triggering mechanism 950 indicating that the GRS 900 is no longer in gesture mode, or based on expiry of a timer of no activity detected from the ADM 960.

At block 1212, in response to a determination that gesture input from the user is completed, the tuner 263 determines whether it is typical for the active application 262 to perform this action, which corresponds to the current GC prediction 265, multiple times (for example, consecutively). The tuner 263 can make this determination based on a prior probability distribution for this action of the active application. In response to a determination that it is typical for the active application 262 to consecutively perform this action, the method proceeds to block 1214 followed by block 1216. In response to a determination that it is not typical, the method 1200 proceeds to block 1220 for discarding the consecutive samples.

In another case similar to the volume-up situation, once the final output 990 from the GC 980 gesture classifier prediction becomes correct, the user may perform multiples of that gesture, consecutively. Note that in normal usage patterns, only certain types of action could be repeated multiple times. For example, typically, the volume adjustment action (either up or down) can be performed multiple times consecutively. Oppositely, it is not typical to perform stop/close/terminate action multiple times consecutively. As such, in the method 1200, the tuner 263 checks if it is typical to perform the gesture (i.e., the corresponding action for the current app) multiple times. Note that this notion of typical can be collected from typical usage of the applications by recording the input sequence and performing (e.g., calculating) a statistical summary. In this particular case, it is sufficient for the tuner 263 to only determine if performing a given action multiple times consecutively is normal or not, where normal can be defined as having the frequency of occurrences larger than a threshold. If this typical usage condition is satisfied, the consecutive gesture samples 284 collected may be labeled by the latest GC prediction (265).

At block 1214, the tuner 263 collects or adds the consecutive gesture samples 284 into a dataset of typically consecutive samples. Additionally, the tuner 263 labels the consecutive samples using the current GC prediction 265 output from the gesture classifier 980, which is identical for the consecutive samples as shown in Scenario 2 of Table 1. At block 1216, the tuner 263 generates or outputs an indicator that new samples are available for future training of the GC model 280.

At block 1218, the tuner 263 determines if extracted features for the consecutive gesture samples are close (i.e., similar). The procedure performed at block 1218 is the same as the procedure performed at block 1208, except that the consecutive GC prediction outputs 990 that are not identical, as shown in the Scenario 2 of Table 1. In response to a negative determination, namely that the extracted features for the consecutive gesture samples are not close (i.e., not similar), the method 1200 proceeds to block 1205 via block 1222. In response to an affirmative determination, the method 1200 proceeds to block 1224.

As shown in FIG. 12B, block 1218 is reproduced for ease of illustration. At block 1222, the active application that is running on the electronic device performs the action (e.g., executes the function) that corresponds to the current GC prediction 265. That is, the tuner 263 determines that current GC prediction 265 does not match the gesture that the user believes that that the user performed or that the user intended to perform. However, at this time, the tuner 263 does not have enough information to determine which other type of gesture will correctly match the action that the user intended or desired. So, the tuner 263 proceeds to operate based on a presumption that the user intended for the active application to perform a different action, based on the user continuing to perform gestures.

At block 1224, in response to a determination that the extracted features for the consecutive gesture samples are close, the tuner 263 retrieves all consecutive gesture samples that are close to the current gesture sample 264. More particularly, the tuner 263 collects the consecutive gesture samples into a set of potentially misclassified samples 269. Samples (especially consecutive gesture samples) with similar extracted features but different GC predictions is likely due to misclassification. In the case of such wrong GC prediction, the user might keep doing the gesture until the user is satisfied, such as when the active application performs the action that the user desires. For a stop/close/terminate action, once correctly predicted by the GC 980, the user may stop inputting more gestures. For a magnitude adjustment action (e.g., volume adjustment), the user may perform several gestures of the same type before the user stops inputting more gestures. It is typical for the magnitude adjustment action to continue until the user preferred magnitude level is reached. For other situations, the case of such wrong GC prediction may cause the tuner 263 to be not confident to determine the label (gesture type) of the gesture samples.

In some embodiments, the tuner 263 can infer that a sequence of gesture samples that has similar input features (e.g., features extracted from incoming radar signals) and different GC predictions likely means there is a wrong prediction, but the tuner 263 cannot determine which action is the correct one (unless additional data is obtained and analyzed). In this situation, the sequence of gestures samples could be discarded.

In another embodiment, the sequence of gesture samples, which may contain some wrongly predicted samples, could still be valuable. For example, this sequence of gesture samples could be labeled by utilizing labels obtained by explicit feedback. One way to determine if these unlabeled samples (i.e., sequence of gesture samples collected consecutively) could be close (i.e., similar) to a cluster of labeled samples, and that label of the cluster could be used for labeling the unlabeled samples. If the unlabeled samples are close enough to satisfy the motion similarity condition, then the label corresponding to that cluster can be used.

At block 1226, the tuner 263 determines whether gesture input from the user is completed. The procedure performed at block 1226 can be the same as the procedure performed at block 1210. In response to a determination that gesture input from the user is not completed, the method 1200 returns to block 1205 via block 1222. In response to a determination that gesture input from the user is completed, the method 1200 proceeds to block 1228.

In one case similar to the stopping-media situation in that the latest prediction (e.g., current GC prediction 265) corresponds to a stop/close/terminate action, and the user no longer inputs new gestures. In this case, the tuner 263 can infer that the stop/close/terminate action was the intended action by the user, and can label these consecutive samples according to the gesture type that corresponds to the stop/close/terminate action in the current application. The occurrence of the user stopping or no longer inputting new gestures is an event indicating that the latest prediction in the final GC output 990 matches the action that the user intended for the set of consecutive samples collected.

At block 1228, the tuner 263 determines whether the current GC prediction output (990 or 265) corresponds to a function of an application 262 that is running on the electronic device 200. In response to a negative determination, the method proceeds to block 1230. In response to an affirmative determination, the method proceeds to block 1232, at which the tuner 263 labels the consecutive samples using the current GC prediction 265 output from the GC 980.

At block 1230, in response to a determination that the current GC prediction output (990 or 265) corresponds to a function of the active application, the tuner 263 determines whether to save the consecutive gesture samples 284 collected. In response to a determination to not save, the collection of consecutive gesture samples 284 is discarded at block 1220. At block 1234, in response to a determination to save the consecutive gestures collected, the tuner 263 saves the collection of consecutive gesture samples 284 for labeling at a later stage, and then the method 1200 proceeds to block 1216 (described above). In some embodiments, the last step of the method 1100 is to make an indication that new samples have been collected, and the next step 'verify labels' of block 1020 of FIG. 10 can be invoked. Note that in the implementation where the unlabeled samples are discarded, there is no need to generate or output this indication, and this method 1200 can restart all over again.

Although FIG. 12 illustrates an example method 1200 for obtaining implicit feedback that includes gesture sample collection, various changes may be made to FIG. 12. For example, while obtaining implicit feedback is less costly from the user experience perspective, the method 1200 has some limitation in that it is opportunistic and may depend on the applications regarding whether the tuner 263 can infer incorrect prediction from a sequence of repeated gestures. As such, depending on the level of weakness of the gesture classifier 980, it may be advantageous to combine the methods for obtaining implicit feedback with the methods for obtaining explicit feedback in order to provide an effective robustification solution.

FIG. 13A illustrates a method 1300 of for validating a newly collected gesture sample based on first distance measurements, in accordance with an embodiment of this disclosure. The method 1300 can be the procedure for verification of the label at block 1020 of FIG. 10. The embodiment of the method 1300 is for illustration only, and other embodiments could be used without departing form the scope of this disclosure.

The request for explicit feedback is responded to by the user, and thus it can be expected that some unintended human error is likely unavoidable. Similarly for implicit feedback, the inference on the labels (or GC predictions within the GC output 990) as described with FIG. 12 cannot guarantee 100% accuracy. To mitigate such an impact, a verification procedure can be executed. The method 1300 can be implemented based on an assumption that unintended error is likely less frequent and not always following the same pattern, and that valid gestures would tend to be more similar from the same user. With this assumption, a pool of collected samples (e.g., dataset of pre-existing validated gesture samples 267) can be used as implicit feedback to verify correctness of a label 266 paired with of a current gesture sample 264. In other words, the method 1300 enables the tuner 263 to avoid outliers, which could be more likely due to wrong labels.

In the method 1300, a k-nearest-neighbor-like approach can be used to identify outliers. At block 1310, first distance measurements are calculated from extracted features corresponding to the current gesture sample 264 to a collected set of gestures samples that correspond to the same type of gesture (e.g., a subset of the dataset of pre-existing validated gesture samples 267 that correspond to the target gesture). The distances here are computed on the input features (i.e., extracted features) that would be used for input to the gesture classifier 980. Any choice of distance measure may be used here. In some embodiments, a machine learning algorithm such as a neural network may be trained by viewing this distance as a metric for regression. In another embodiment, the principal component analysis (PCA) may be used to decompose the input features (which may be 2D or 3D matrices) and to compute the distance using the representations in the decomposed space. Any other decomposition method such as wavelet, Fourier transform, etc., may also be used.

At block 1320, once the distances are computed, the computed distances are compared against a distance threshold 268 to determine if the new, current gesture sample 264 is 'close' (i.e., less than distance threshold 268) to the existing samples in the already verified dataset 267. For example, if the number of close existing samples is larger or equal to N existing samples, then the tuner 263 determines that the label 266 applied to the new, current gesture sample 264 is correct (illustrated by the valid arrow 1330). When the label 266 is correct, the corresponding current gesture sample 264 can be added into the verified sample set 267, which are as training samples ready for use in the tuning of the gesture classifier model 280. Otherwise, the method proceeds to block 1340. The embodiments of block 1340 shown in FIG. 13A shows that the label 266 is determined as invalid (illustrated by the invalid arrow 1345). The embodiment of block 1340 shown in FIG. 13B shows that if the label 266 is invalid, it cannot yet be ruled out that the current gesture sample 264 could really be a new pattern that is not close to the already collected and verified samples 267.

FIG. 13B illustrates a method 1350 of for validating a newly collected gesture sample based on first distance measurements and second distance measurements, in accordance with an embodiment of this disclosure. The method 1350 can be the procedure for verification of the label at block 1020 of FIG. 10. The embodiment of the method 1350 is for illustration only, and other embodiments could be used without departing form the scope of this disclosure.

The method 1350 of FIG. 13B includes the same components as the method 1300 of FIG. 13A, except for block 1340 is different to allow such a possibility to adapt to new patterns for the gesture types pre-existing in the gesture vocabulary 600. That is, the current gesture sample 264 may still be stored for some duration of time, even when a current gesture sample 264 is determined as invalid, in order to allow new patterns to be identified.

At block 1360, a second distance measurements are calculated from extracted features corresponding to the current gesture sample 264 to a collected set of gestures samples that have been collected so far that were determined to be invalid (e.g., a collection of consecutive gesture samples 284 that correspond to the same target gesture).

At block 1370, if there are enough number of samples in this set of candidate samples (i.e., samples that have been determined as invalid so far), the set of candidate samples could be used to determine whether some of those samples could be valid as a new pattern of gestures. Particularly, if there are more than M samples in this set of candidate samples that are determined to be close to the current gesture sample 264, based on using the same distance metric 268, then the set of candidate samples could be revalidated as representing a new pattern (illustrated as the valid arrows 1375). Further, the revalidated gesture samples can be added into the valid sample set 267. The invalid arrow 1380 shown in block 1340 of FIG. 13B shows that the label 266 is determined as invalid, in response to a determination that the second distance measurements do not satisfy a proximity condition (i.e., second distance measurements less than the distance threshold 268) for at least a threshold number (M) among the dataset of pre-existing invalidated gesture samples 282, respectively.

Figure 14:
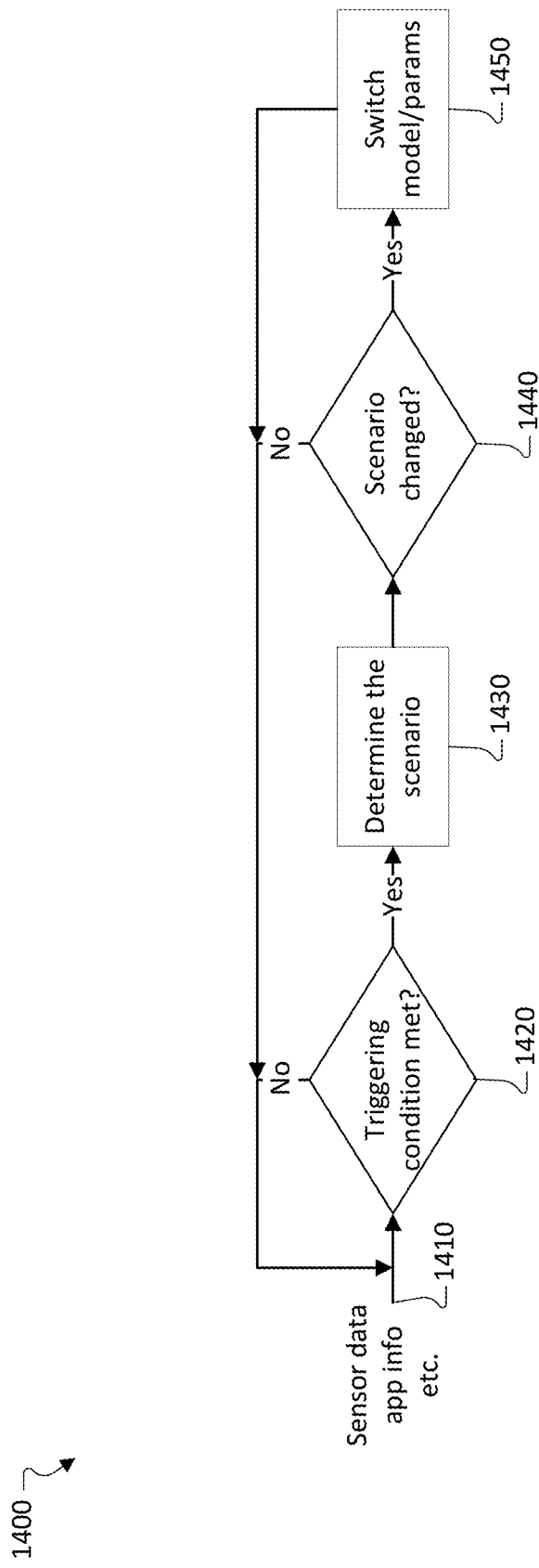
FIG. 14 illustrates a method for adapting a gesture classifier model or adapting radar parameters based on an operating environment, in accordance with an embodiment of this disclosure.

FIG. 14 illustrates a method 1400 for adapting a gesture classifier model or adapting radar parameters based on an operating environment, in accordance with an embodiment of this disclosure. The method 1400 enables robustification by optimizing parameter/classifier choices according to contextual information. The embodiment of the method 1400 shown in FIG. 14 is for illustration only, and other embodiments could be used without departing from the scope of this disclosure. The method 1400 could be performed by a processor 240 of the electronic device 200 executing the tuner 263, as described below.

The gesture classifier's performance may depend on the environmental factor in several ways. For example, different environments surrounding the electronic device 200 (or surrounding the user who is interacting with the electronic device 200) may have different levels of clutter reflections, the environment or operating scenario may also constrain how the user performs the gestures. For example, a user in a car possibly while driving might perform the gestures differently (e.g., with jitter oscillations) than when sitting at an office desk. The environment or operating scenario may also have strong influence on what non-gesture motions are likely. For many applications 262, the input actions (to be associated with gestures) are likely not uniformly used, for example, as a prior probability distribution may indicate. This means that the prior distribution for each type of gesture may depend on the applications 262. The method 1400 provides a technical advantage by applying appropriate prior distribution for the gesture classifier 980 to adapt to the expected usage of the applications 262. The method 1400 provides additional technical advantages adapting to these factors based on dependency upon the operating environment and/or active application 262, thereby making the gesture classifier 980 more robust.

The method 1400 enables the tuner 263 to adapt the GC model 280 and/or radar parameters to the environment and/or application 262. The method 1400 begins with receiving context information 1410 that the tuner 263 analyzes. The context information 1410 can include sensor data detected by the sensors 275, application information (e.g., identification of the active application running on the electronic device 200), etc. The sensor data can measure the environment, for example, motion sensor data can indicate that the operating environment includes the user riding a car that is being driven. Some sensor data, which can be detected by an IMU sensor, a hand grip sensor, etc., can provide some contextual information of the device environment. Some application information that indicates which application 262 is using the GRS 900 interface is known to the operating system 261, and it is assumed this application information is a readily available piece of information. The context information 1410 can include device type (e.g., a smartphone, smart watch, AR glasses, etc.).

For ease of explanation, some terminology is introduced here. The term scenario means the operating environment and/or active application used. Model adaptation includes both the switching of the models (e.g., these GC models could be from a model zoo where each model is trained specifically for the scenario) and the choice of prior weights that could be applied on the output 986 probabilities from the gesture classifier (e.g., applied in the penultimate layer in a neural network).

At block 1430, the scenario is determined using side information (e.g., contextual information 952 of FIG. 9, or contextual information 1410) available at the electronic device 200. The scenario can be referred to as a state (e.g., operating state), and consequently, it is expected that the state transition occurs with some interval of time and does not change continuously.

Block 1420 is included in the method 1400 for efficiency. Rather than determining the scenario in a continuous manner (e.g., whenever there is a new sensor reading within the contextual information 1410), the procedure at block 1420 is executed to apply a triggering condition before block 1430 is executed to determine the scenario. For the active application information to determine a scenario change, the triggering can be when a new application 262 becomes active. For the sensor data to determine scenario change, the scenario change depends on the sensor types and the scenario of interest. For example, if a smartphone is configured with two types of scenario: static scenario and while-driving scenario. The static scenario is when the electronic device is static on a surface such as a desk. The while-driving scenario is when the smartphone is placed on or attached to a fixture on the dashboard of a car. In the case of the while-driving scenario, motion sensor data (e.g., from an IMU) could be sufficient for determining the triggering condition or determining that the triggering condition is satisfied. For example, the triggering condition can be defined as being satisfied when there is a large (e.g., greater than a threshold) and not smooth one-dimensional translational change.

Once the triggering condition is met at block 1420, the scenario is determined at block 1430. Referring again to block 1430, a pattern matching method can use some machine learning techniques or can be rule-based conditions. For example, the tuner 263 can determine that the scenario is the static scenario by detecting based on thresholding on motion information. The while-driving scenario can be determined based on a signature for the while-driving scenario, which signature can be motion patterns. The signature's motion patterns can include the speed, translational motion (when the car is moving), as well as the small-scale oscillation due to running the engine of the car and/or due to driving on the road.

At block 1440, the tuner 263 determines whether the state/scenario changed or transitioned. The triggering condition is also useful in avoiding premature transition of the state/scenario. For the while-driving scenario, the car may come to a stop for a little while (and the engine could be temporarily OFF, or the car could be an electric vehicle that does not have vibration when the vehicle is not moving), and the tuner 263 (with the triggering condition disabled) determines to switch to the static scenario. With the triggering condition enabled, the tuner 263 will not attempt to detect the scenario because when the car slows down to the stop, the contextual information 1410 indicates that the car only has one-dimensional translational motion that does not satisfy the triggering condition. On the other hand, if the user yanks the electronic device 200 (e.g., smartphone) from the fixture on the car's dashboard, a large change in the motion data will be detected within the contextual information 1410, which would satisfy the triggering condition for changing the state/scenario away from the while-driving scenario (for example, due to departure from the signature).

At block 1450, after the changed scenario is determined, the corresponding parameters and/or GC model are selected and switched to. The selection of those parameters and/or GC model changes are described further below.

Several radar parameters could be optimized for different operating environments, and these radar parameters can include radar configuration parameters and/or radar signal processing parameters. For example, referring again to the example smartphone configured with a two-scenario state machine, different clutter responses can be expected between the static scenario and the while-driving scenario. More clutters can be expected from static objects while operating in the while-driving scenario due to the vibration of the smartphone device itself, which vibration can be caused by the car engine and/or driving on the road. The clutter removal parameters used in the static scenario are likely not optimal for the while-driving scenario. For example, the clutter removal for the static scenario might simply be a low-pass filter with a cutoff frequency of f1. In comparison, the clutter removal for the while-driving scenario might be better when including a bandpass filter with a different lower cutoff frequency of f2 (that might be different from f1).

Another parameter of interest that could be selected is the maximum range supportable. In the more clutter-heavy while-driving scenario, the signal to clutter ratio might degrade faster with distance than in the static scenario, and the reliable range for the GRS 900 could be shorter for the while-driving scenario than the static scenario. Also, in this particular example, the position of the user (as the driver) in the driving situation is more constrained. Particularly, as the driver of the car, the user sits in a fixed position relative to the smartphone device, and a distance to where the hand of the user performs the gestures might not change much compared to the less constrained static scenario. For these reasons, this shorter supportable range might not be a limitation, but an operational advantage instead.

For the optimal parameter search for a given scenario, a grid search methodology may be used. To conduct this search for optimal parameters, the training data is collected initially in each of the defined scenarios. Then, fixing a metric of interest to track, the grid search is conducted. For example, the signal to clutter ratio can be used as the metric for the clutter removal lower cut off frequency and for the maximum supportable range. Next, for each choice of the parameter combination, the signal to clutter ratio is computed for all the samples in the collected data in that scenario. After completing all of these searching steps, the parameter combination which has the highest signal to clutter ratio is selected as the parameter choices for that scenario. Other metrics may also be used.

In a similar manner, the tuner 263 also optimizes each classifier model for each of the defined scenarios. Note that it is not necessary that the scenarios defined for this purpose have to be the exact sample as those defined for parameters selection. However, it is desirable that the scenarios defined should form a tree structure, wherein any scenario within the tree structure belongs to only one parent scenario defined for the parameter selection. This tree structure is set forth because the selected parameters have an impact on the extracted radar features that will be used as the input to the gesture classifier 980. If the tree structure was disabled (or not required), then a scenario defined is allowed to belong to two or more defined in the parameter selections, and the two or more types of processing could be mixed causing extra and unnecessary variations that could instead degrade the performance of the gesture classifier 980. For most practical cases optimization and/or selection of a classifier model, it is simpler and more convenient to define the same set of scenarios as those defined for the parameter selection, as is the assumption for the following example embodiments in FIG. 15.

The model optimization technique that the tuner 263 employs is applied to the two-scenario example that includes the static scenario and driving scenario. There are at least two main benefits for training the GR models 280 that are tailored to each of these scenarios. Firstly, a main benefit is in how the user performs the gestures. In the static scenario (e.g., at a desk in an office or at home), the user does not have too much constraint. On the other hand, in the while-driving scenario, the user is sitting at a fixed position relative to the smartphone device such that the user is constrained in the level of freedom that the user is afforded to perform the motions of the gestures.

Secondly, a main point is the nature of the NG samples may also be different. In the static scenario such as in an office, there are a wider range of possibilities for NG motions. For example, if the user working at a desk where the smartphone device located in an office, then people (e.g., coworkers or business associates) could be walking near the device, or the user might perform tasks near the device (e.g., typing, using a mouse, etc.)). The GRS 900 might detect the motion of people passing by while walking near the device. On the other hand, for the while-driving scenario, there will be no one walking near the device, and there is also no typing or using a mouse near the device. However, the user might reach to adjust or toggle actuators on the dashboard of the car. Substantial differences in the nature of the NG samples can be expected for the different scenarios. Therefore, by collecting gesture samples for each scenario separately, the GR preprocessing (at block 1530 of FIG. 15) can be used with the optimized parameter choices, and including the NG samples for the scenario, thereby providing a better performance for the gesture classifier 980.

Figure 15:
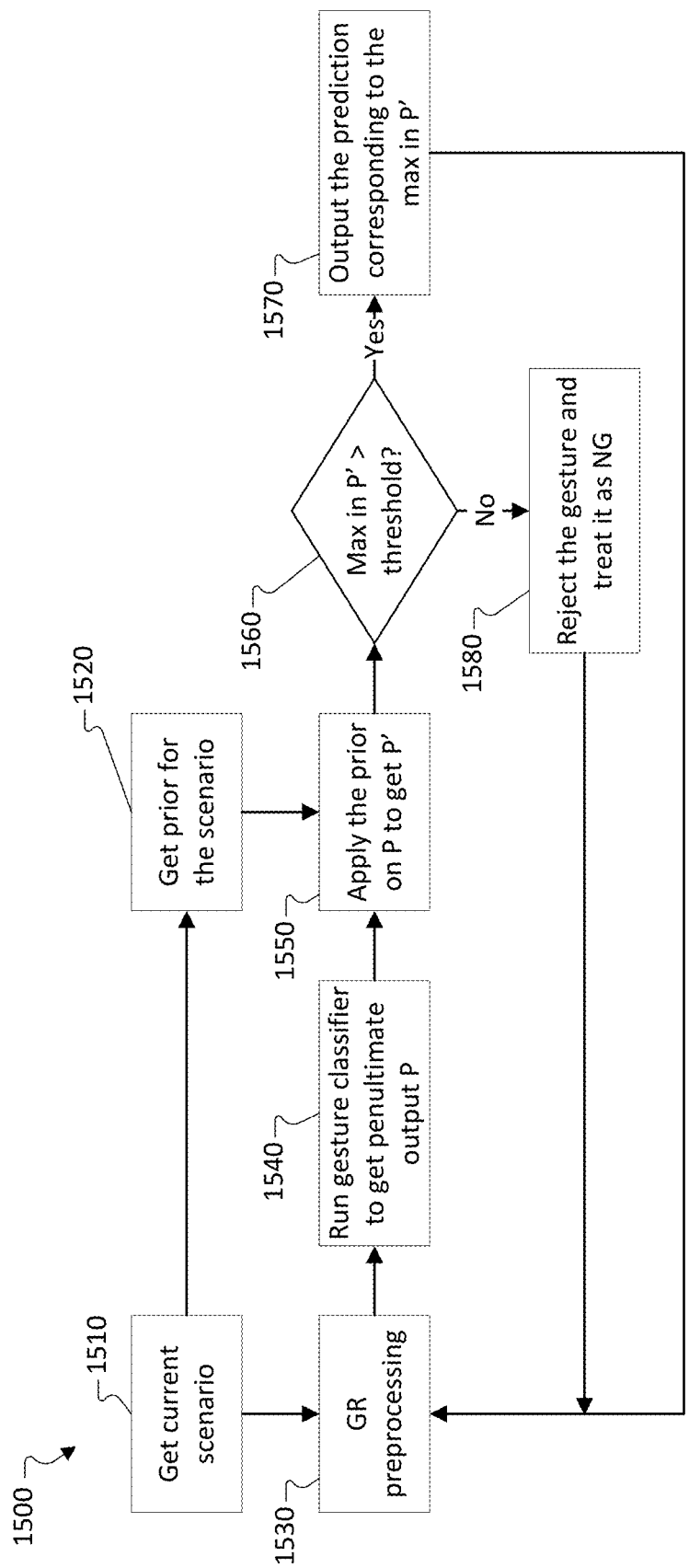
FIG. 15 illustrates a method for robustifying the gesture classifier performance based on a prior on the likelihood of each gesture, in accordance with an embodiment of this disclosure.

FIG. 15 illustrates a method 1500 for robustifying the gesture classifier performance based on a prior on the likelihood of each gesture, in accordance with an embodiment of this disclosure. The method 1500 shows that prior probability distribution on the likelihood of each gesture could be used to robustify the performance of the gesture classifier 980. The embodiment of the method 1500 shown in FIG. 15 is for illustration only, and other embodiments could be used without departing from the scope of this disclosure. The method 1500 could be performed by a processor 240 of the electronic device 200 executing the tuner 263, as described below.

By way of comparison, optimizing the GR model 280 is performed in the method 1400, while in the method 1500 of FIG. 15, the tuner 263 adapts a prior distribution that reflects the usage of the different gestures for a given application. This application-specific adaptation of the prior distribution is useful when the rates of usage for each type of gesture in the gesture vocabulary 600 is not uniform. An imbalance is present where one type of gesture is more likely or much more likely to be used than another gesture type. The method 1500 includes a procedure to account for the presence of such imbalance to provide a benefit, particularly at block 1550, prior is applied on to the probability output from the gesture classifier 980.

To aid in explanation of the method 1500, refer again to the multimedia player application in which the play/pause action might be used less frequent than volume adjustment action. Furthermore, some sequence of actions might be unlikely. For example, a sequence of play/pause action then followed by one volume adjustment action, repeatedly is not normal or typical. On the other hand, some sequence of actions might be likely and typical, such as consecutive volume adjustment is normal. If a prior probability distribution that indicates the likelihood of occurrences of these different actions (that are linked to a gesture or a gesture sequence) is known by the tuner 263, then a confidence level can be applied for thresholding to increase robustness of the gesture classifier 980. A higher confidence threshold can be applied to a less likely action and a lower confident threshold can be applied to a more likely action. Particularly, in the method 1500, instead of setting different thresholds for different applications (with different priors), the prior is applied (at block 1550) on the probability (e.g., the penultimate output 986 of the gesture classifier 980) and compared (at block 1560) against a fixed threshold. The method 1500 is an example case in which the prior probability distribution enforces that the output P from the gesture classifier 980 (i.e., before applying the prior) has high confidence for rare occurrences. In other words, this adaptation is automatic for each application 262 by using the corresponding application-specific prior probability distribution.

The method 1500 begins at block 1510, at which the operating current state/scenario is obtained. To obtain the current state/scenario, the tuner 263 can determine the current state/scenario by executing a procedure similar to the procedure of block 1430 of FIG. 14. The method proceeds from block 1510 to both of blocks 1520 and 1530.

At block 1520, a prior(s) for the current state/scenario is obtained. To obtain the prior(s), the tuner 263 starts with operably coupling to or incorporating a relatively accurate gesture classifier 980, and simply logs every GC prediction output 990 from the gesture classifier 980 as ground truth. This logging of all of the GC prediction outputs 990 is performed separately for each of the applications 262, respectively. For example, several types of the prior(s) can be utilized, which are referred to as 0-th order, 1-st order, and special sequence prior. Accordingly, the tuner 263 obtains the prior(s) on an application by application basis. The 0-th order prior is computed simply by counting the frequency of occurrences of each gesture used in each of the applications 262, respectively. The 1-st order prior is computed based on counting the frequency of occurrences of a gesture type of interest under a condition that a certain gesture type was used before the gesture type of interest. The 1-st order prior captures some sequential relationships among the gestures in the gesture vocabulary 600. The special sequence prior depends on the applications 262. One example special sequence prior for a multimedia player application is that the sequence of repeated play/pause action and one adjustment of volume is not typical and could be assigned to have a low prior probability that makes this atypical sequence more likely to get rejected (e.g., rejected at block 1560 by the thresholding).

It is practical to use the 0-th order and 1-st order prior(s) because these computations consume or require low computational load and also not too much data storage consumed. A gesture sequence that is longer than two consecutive gesture samples could be more difficult to compute because a much greater number of samples is needed to empirically estimate the prior.

Regarding the special sequence prior, the tuner 263 assigns this type of prior based on the application 262 a priori with the understanding that certain types of sequence are not considered normal operations (e.g., flagged as an abnormal sequence). The example method 1500 is based on an assumption that the prior(s) obtained at block 1520 is 0-th order prior. In other embodiments, when the 1-st order prior is used, the history of which type of gesture was used before the current gesture is also input to the block 1520 (illustrated as 'Get prior for the scenario'). The method proceeds from block 1520 to block 1550.

At block 1530, gesture recognition preprocessing is performed. At block 1540, the GRS 900 operates to generate a penultimate output P. For example, the penultimate output P can be the same as the prediction output 986 from the ML-based classifier of FIG. 9A. At block 1550, the tuner 263 generates an ultimate prediction output P' by applying the prior (obtained at block 1520) to the penultimate output P obtained from the GRS 900. At block 1560, if the tuner 263 determines that a threshold probability is exceeded by the greatest probability value among the probabilities within the ultimate output P' (illustrated as Max in P'), then method proceeds to block 1570. If the threshold probability is not exceeded, then the method proceeds to block 1580. As an example, the probability threshold can be 0.5. At block 1570, the type of gesture corresponding to the Max in P' is output as the GC prediction output 990. At block 1580, the current gesture sample 925 is rejected and treated as a non-gesture.

Figure 16:
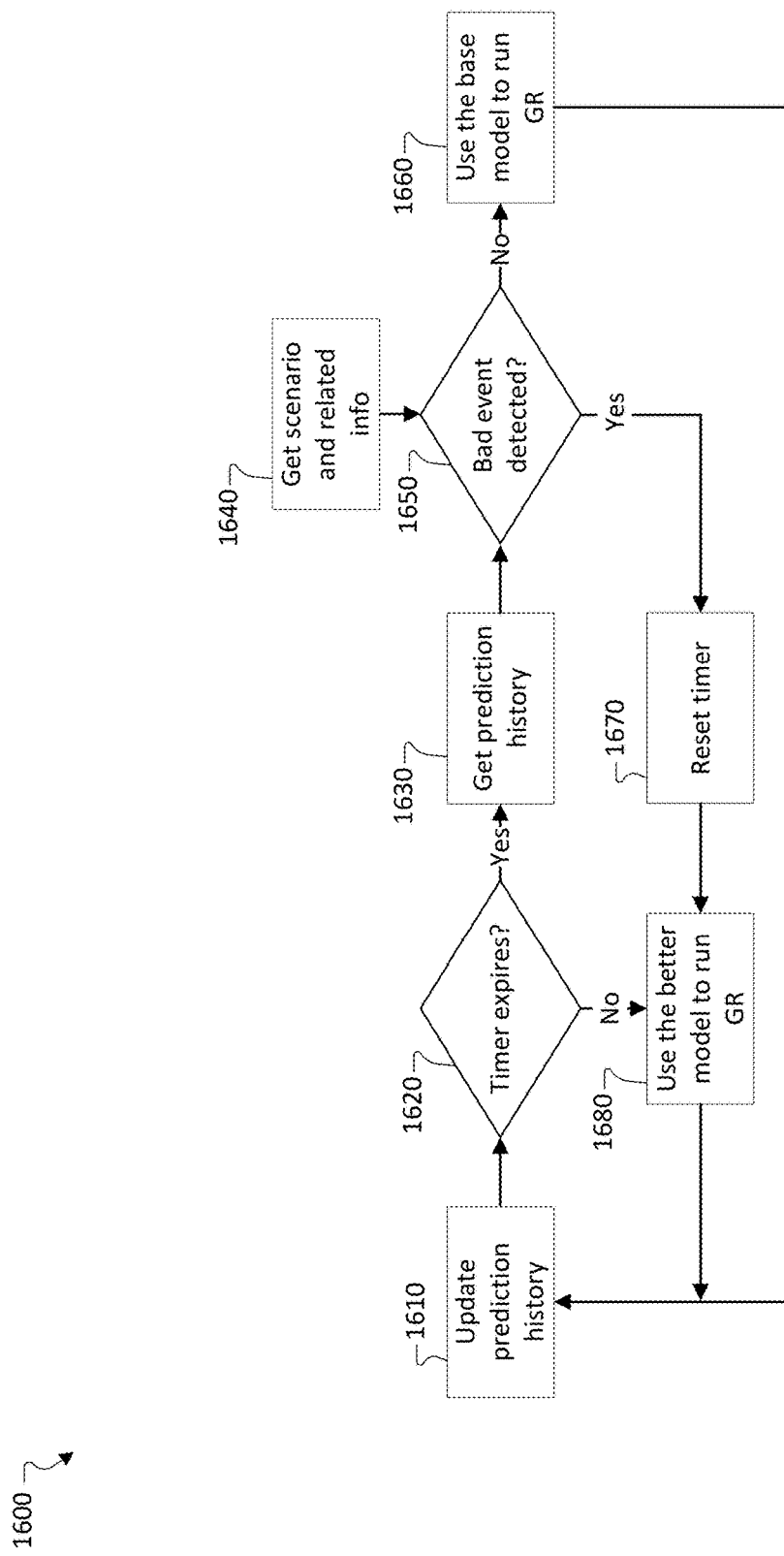
FIG. 16 illustrates a method for switching the gesture classifier to temporarily use a more-complex model based on a likelihood that the base model caused an incorrect prediction, in accordance with an embodiment of this disclosure.

FIG. 16 illustrates a method 1600 for switching the gesture classifier to temporarily use a more-complex model based on a likelihood that the base model caused an incorrect prediction, in accordance with an embodiment of this disclosure. The method 1600 is an example of robustification by optimizing operation according to contextual information. The embodiment of the method 1600 shown in FIG. 16 is for illustration only, and other embodiments could be used without departing from the scope of this disclosure. The method 1600 could be performed by a processor 240 of the electronic device 200 executing the tuner 263, as described below.

During experimental trials, one particular phenomenon that the method 1600 solves is to address the observation that incorrect predictions can show a temporal correlation. For example, when there is a wrong prediction for a gesture input by the user, that same gesture performed multiple times consecutively by the user sometimes results in the same wrong prediction, consecutively. This phenomenon could be due to the temporal correlation in how the user performs the gesture, however, the method 1600 is designed as a technical solution identify and to break this bad temporal correlation.

In the method 1600, when such a bad temporal correlation phenomenon is happening, the tuner 263 can switch the gesture classifier model 280 to have some inherent stochasticity and/or higher accuracy. The more accurate GC models generally require higher computation complexity, and thus for optimal operation could be used (e.g., executed) only when needed. For example, FIG. 9A shows that the gesture classifier model 280 includes a base GC model 280*a*, and a more-complex GC model 280*b* compared to the base GC model 280*a*. The more-complex GC model 280*b* can have inherent stochasticity and/or higher accuracy.

An example of a more accurate GC model could be an ensemble solution, for example, three or five gesture classifier models could be used to produce an ensemble prediction, which typically would boost the accuracy by several percentage points or even more. However, the computational complexity would increase proportional to the number of GC models in the ensemble.

As an example for the stochasticity, data augmentation can be incorporated into the extracted features input via the GRS 900 and tuner 263. For example, consider a two-dimensional extracted feature where one dimension is time, and a random shift can be employed along the time domain to create slightly modified extracted feature input that may cause the gesture classifier model 280 to produce a different prediction.

Rather than using just one augmented input, multiple versions of the augmentation can be applied, and the ensemble solution combining on the output can be applied. One or multiple gesture classifier models could be used, but as a tradeoff, using multiple models would require consumption of more computational resources (e.g., more memory to hold all the models and/or the loading cost). The following options could be used to break the bad temporal correlation, and are listed in order from lower to higher computational and memory cost): (i) applying a random augmentation on the input feature and using only one gesture classifier model; (ii) applying k random augmentation on the input feature (to create k augmented input features) and using only one gesture classifier model; (iii) using the original input feature on an ensemble model that includes k gesture classifier models; or (iv) applying k random augmentation on the input feature (to create k augmented input features) and also using an ensemble model that includes k gesture classifier models.

The bad temporal correlation phase only happens occasionally, and as a result, the method 1600 is designed as a cost-effective solution to use the more-complex models (e.g., costlier models in terms of computational resources) to break the temporal correlation, when necessary.

The method 1600 begins at block 1610, at which the prediction history is updated. For example, the samples collected consecutively 284 during normal operations include the sequence of each final GC output 990, which sequence can be referred to as the prediction history. Whenever the GRS 900 outputs a new prediction via the GC 980, the current gesture sample 284 is added to update the prediction history, and some older gesture samples can be discarded from the samples collected consecutively 284.

At block 1620, the tuner 263 determines whether a timer has expired. This timer controls the duration that a more-complex GC model 280b is used by the GC 980. This timer is enabled or triggered to start counting time when the timer is reset at block 1670. If the timer is enabled and not expired, the method 1600 returns to block 1680 to continue operating the GC 980 using the more-complex GC model 280b. If the timer is disabled or expired, the method 1600 proceeds to block 1630.

At block 1630, the prediction history is obtained. The procedure performed at block 1630 can be the same as the procedure performed at block 1610.

At block 1640, the tuner 263 obtains scenario information and information related to the operation scenario, which may include both the environmental information as well as application information and usage patterns. The procedure performed at block 1640 can be the same as the procedure of block 1430 of FIG. 14 or block 150 of FIG. 15.

At block 1650, the tuner 263 determines whether a bad event is detected. Particularly, to determine whether the bad event is detected, the tuner 263 utilizes scenario information and information related to the current scenario that was obtained from block 1640. The tuner 263 implements methods to detect such bad temporal correlation phase. However, a direct detection of such bad temporal correlation phase is not a trivial algorithm. As part of detecting the bad event, the tuner 263 detects when there is a likelihood for an incorrect prediction instead. This would include the bad temporal correlation phase as well as other wrong prediction cases. For simplicity, this happening of a bad temporal correlation phase/phenomenon is referred to as the bad event.

When such a bad event is detected, the gesture classifier model 280 is switched to one of the better GC models described above, for example, the more-complex model 280b. In other words, in response to the bad event detected, the method 1600 proceeds from block 1650 to block 1670 for resetting the timer, followed by block 1680 for switching from the base model 280a to the more-complex model 280b. The purpose of switching to the more-complex model 280b is to reduce the likelihood for error (i.e., wrong prediction) that might concentrate in time. The method 1600 enables the GC 980 to switch the model 280 back to the base model 280a after timer duration expires. In other words, the method 1600 enables the GC to employ the more-complex mode 208b only for the duration while the timer is enabled and not expired. Each time that a bad event is detected, then the timer is reset at block 1670. While the timer is active/enabled, the better model (more accurate but costlier) may be used. If the timer expires, as determined at block 1620, then the tuner 263 first checks for a bad event. Particularly, if the bad event is not detected, then at block 1660, the GC model 280 is switched back to the base model 280a is used to run the GRS 900.

For the case of bad temporal correlation, the use of one augmented input feature can still mitigate the bad event problem. For causes other than the bad temporal correlation, the use of one augmented input feature might not mitigate. On the other hand, ensemble models (with or without the augmentation) would be helpful for each of the above-described cases (for example, all cases).

Although FIG. 16 illustrates an example method 1600 for switching the gesture classifier to temporarily use a more-complex model based on a likelihood that the base model caused an incorrect prediction, various changes may be made to FIG. 16. For example, the method 1600 includes additional procedures to detect the bad temporal correlation phase. The tuner 263 uses a sequence of prediction result in the recent past (e.g., the last k prediction results). These signatures of potential incorrect predictions cannot provide a 100% indication that there really is a wrong prediction. It is only considered that wrong prediction is likely. Also this accuracy does not have direct negative impact on the embodiment method 1600 in terms of the performance. If the tuner 263 falsely detects a situation to be the bad event (when the situation actually is not the bad event), the tuner 263 only costs a temporary increase of computational cost. And when the tuner 263 detects bad events correctly, the performance of the GC 980 is improved (via utilization of the better GC model 280b) compared to performance of the base model 280a. An increase of accuracy in the bad event detection, means the tuner 263 can be achieve more benefits and the less computational cost.

The different signatures that could be used to detect the bad events are described as follows. A first signature includes a sequence of valid gestures followed by N consecutive non-gestures. For example, N denotes the parameter; a smaller N will make it easier to get triggered, but at the same time the accuracy of detection of the bad even would also be reduced, as a tradeoff.

A second signature includes rejection by the gating mechanisms after the gesture classifier 980. When this post-GC gating occurs, the meaning is that the prediction output 990 from the gesture classifier 980 is not consistent with past observations in terms of the representation used in the post-GC gating mechanisms (which could be some statistical summaries of radar detection results), and thus the current GC prediction output is likely an outlier. This also means that the current GC prediction from the gesture classifier 980 is likely to be incorrect. Instead of just one rejection, the post-GC gating condition can be modified to have N rejections within some duration T.

A third signatures includes the output prediction having low confidence. That is, the confidence level from the gesture classifier 980 is designed differently according to the choice of the ML-based solution. A simple solution can use the output probability from the softmax layer. In that case, high confidence may mean probability of the selected output is greater than 0.8 and low may means less than 0.5. In some embodiments, more advanced methods of training for a better reflection of the confidence level than softmax may also be used. Further, the counting of rejections can be utilized in a similar manner as described above with the second signature. In this case, the low confidence event is counted instead of rejection, and if N such events are detected within some duration T, then the bad event detected is determined. The GRS 900 could then switch to use the more-complex model 280b until the timer expires at block 1620.

As a fourth signature, if an open-set recognition solution is used, the number of unknown predictions can be counted as a signal for detecting bad event. An open-set recognition solution outputs the prediction as unknown for an input pattern that was not seen in the training of the ML-based GC model. Since the pattern is not seen (or not seen enough) as training samples, it is reasonable to conclude that the GC prediction has low confidence. Then the counting of this unknown prediction(s) is conducted in a similar manner as the counting of rejection and low confidence event.

As a fifth signature includes detecting some unusual sequence of input for the current application. For example, for a music player application, a repeated sequence of play and then pause within a short duration is not a normal usage. As such the detection of such abnormal sequence can be used as an indicator of likely incorrect predictions by the gesture classifier 980.

Figure 17:
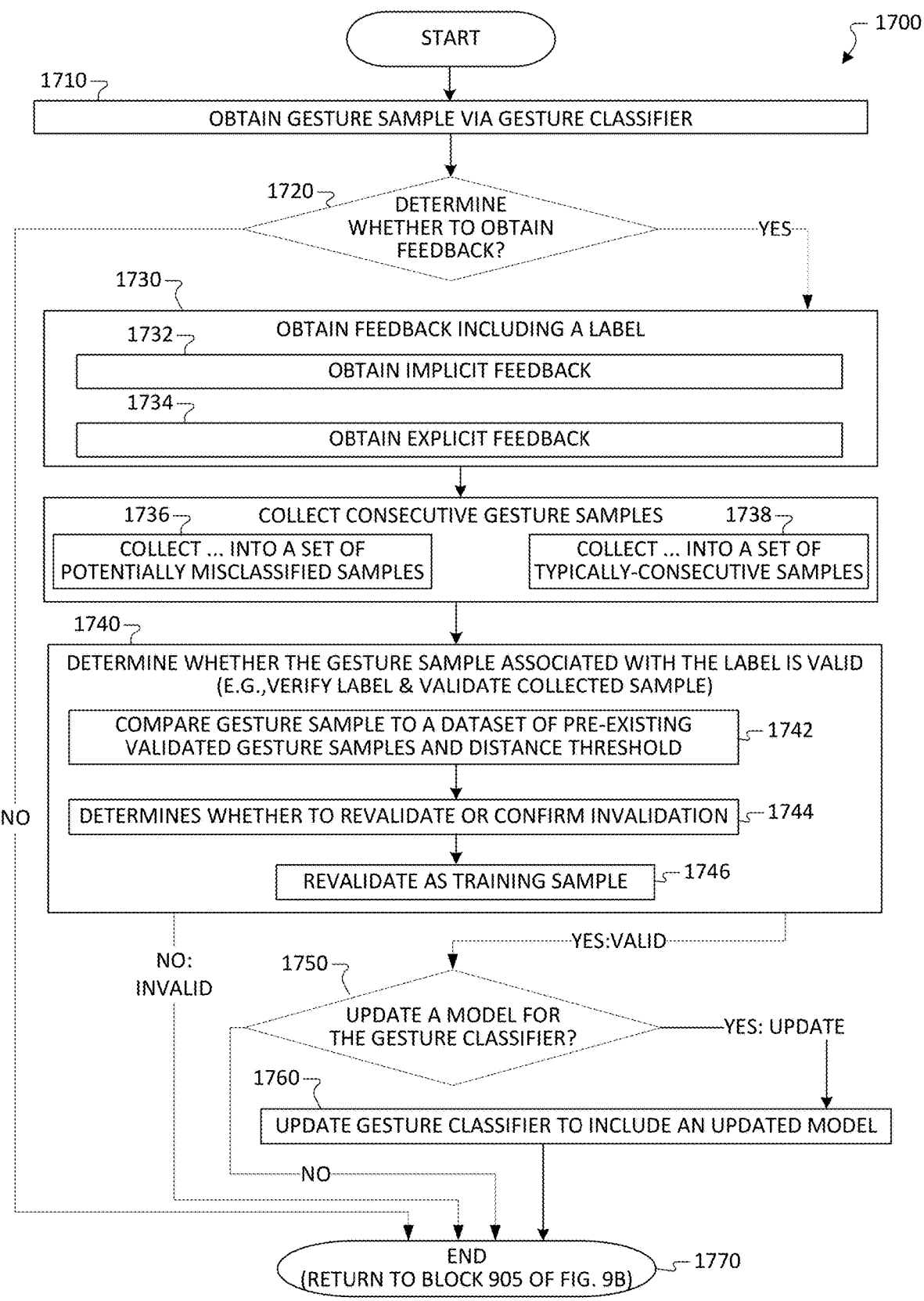
FIG. 17 illustrates a method for robustifying radar-based gesture recognition solution using contextual information in accordance with an embodiment of this disclosure.

FIG. 17 illustrates a method 1700 for robustifying radar-based gesture recognition solution using contextual information in accordance with an embodiment of this disclosure. The embodiment of the method 1700 shown in FIG. 17 is for illustration only, and other embodiments could be used without departing from the scope of this disclosure. The method 1700 is implemented by an electronic device, such as the electronic device 200 of FIG. 2, electronic device 300 of FIG. 3, electronic device 400 of FIG. 4, or radar transceiver 500 of FIG. 5A. More particularly, the method 1700 could be performed by a processor 240 of the electronic device 200 executing the tuner 263, as described below.

At the start of the method, the processor 240 is operably connected to a transceiver, such as the radar transceiver 270. The transceiver 270 can transmit and receive radar signals, such as mmWave radar signals.

At block 1710, the processor 240 obtains a gesture sample via a gesture classifier. More particularly, to obtain a gesture sample, the processor 240 can call or trigger operation of a gesture recognition system (GRS) that implements the gesture recognition method 901 of FIG. 9B. For example, the GRS can output a gesture sample 264 for storage in the memory 260 of FIG. 2. The gesture sample 264 includes parameters of features extracted from the radar signals based on user motion in performance of a gesture. Examples of these parameters include range variation (i.e., distance variation), Doppler (e.g., velocity or speed), angle variation, duration of the activity, etc. The gesture classifier outputs a GC prediction 265 indicating a type of gesture associated with the gesture sample 264.

At block 1720, the processor 240 determines whether to obtain feedback for a target gesture associated with the gesture sample.

At block 1730, in response to a determination to obtain the feedback, the processor 240 obtains the feedback for the target gesture. The feedback includes a label indicating a type of gesture. The feedback can be implicit feedback or explicit feedback, as shown at blocks 1732 and 1734. The GC prediction 265 and the label 266 are distinct from each other, although a single gesture sample can be related to both the GC prediction 265 and the label 266, and although both the GC prediction 265 and the label 266 indicate types of gestures, respectively. The GC prediction 265 is determined by the GRS 900, based on the GC model 280 within the gesture classifier 980. The label 266 is determined by the tuner 263, based on the explicit feedback received from the user and/or implicit obtained from preexisting gesture samples (267 and 282) and from gesture samples collected (284) during normal operation.

At block 1732, the processor 240 obtains implicit feedback.

At block 1734, the processor 240 obtains explicit feedback.

At block 1740, the processor 240 determines whether the gesture sample associated with the label is valid based on comparison to a dataset of pre-existing validated gesture samples and a distance threshold. More particularly, the gesture sample 264 obtained at block 1710 is compared to a dataset of pre-existing validated gesture samples 267, in order to determine whether the gesture sample 264 is within a proximity range defined by the distance threshold 268 of FIG. 2.

In response to a determination that the gesture sample associated with the label is invalid, the method 1600 ends as shown at block 1770. The end block 1770 of the method 1600 can include the processor 240 restarting the method 901 of FIG. 9B followed by the method 1700 of FIG. 17.

At block 1750, the processor 240 in response to determining that the gesture sample 264 associated with the label 266 is valid, determine whether to update a model 280 for the gesture classifier using the validated gesture sample as a training sample.

In some embodiments, the method 1700 incorporates some procedures performed in FIG. 11. Particularly, at block 1720, to determine whether to obtain the feedback for the target gesture, the processor 240, after a timer expires, determines to obtain explicit feedback based on a determination that a prediction output from the gesture classifier corresponds to a pair of gestures from a gesture vocabulary that are confused with each other at an error rate that exceeds a threshold confusion ratio. Similar to the procedure performed at block 1110 of FIG. 11, the duration of the timer is determined based on a mean error rate (c), a variance (a) of the error rate, or a number of samples (n). Examples of the threshold confusion ratio are shown in FIG. 8. At block 1734, to obtain the feedback, the processor 240 requests explicit feedback from a user to compare a type of gesture that the user performed to at least one type of gesture from among the gesture vocabulary 600 of FIG. 6.

In some embodiments, the method 1700 incorporates some procedures performed in FIG. 12 based on satisfying a motion similarity condition. Particularly, at block 1720, to determine whether to obtain the feedback for the target gesture, the processor 240 determines whether the gesture classifier 980 output different prediction outputs 990 for consecutive gesture samples 284 including a current gesture sample and a previous gesture sample. That is, the prediction output 990 corresponding to a current gesture sample is compared to the prediction output 990 corresponding to a previous gesture sample. Further, the processor 240 determines whether a specified extracted feature (e.g., AoA) of the current gesture sample and the specified extracted feature (e.g., AoA) of the previous gesture sample are similar to each other based on satisfying a motion similarity condition that is defined by a distance metric. Examples of the motion similarity condition described with block 1208 in FIG. 12A or block 1224 of FIG. 12B. In response to a determination that the gesture classifier 980 output the different prediction outputs 990 for consecutive gesture samples and that the motion similarity condition is satisfied, the processor 240 determines to obtain implicit feedback and collect the consecutive gesture samples 284 into a set of potentially misclassified samples 269. At block 1736, the consecutive gesture samples are collected (e.g., added) into the set of potentially misclassified samples. At block 1732, to obtain the implicit feedback, the processor 240 labels the set of potentially misclassified samples using a final prediction output from the gesture classifier 980 in the consecutive gesture samples collected. For example, if the consecutive gesture samples collected are a set {Sample1, Sample2, . . . SampleN}, and if the corresponding prediction outputs are a set {Prediction1, Prediction2, . . . PredictionN}, then the final prediction output is PredictionN as the most recent prediction output.

In some embodiments of block 1720 incorporates some more procedures performed in FIG. 12 based on a function that an application that typically executes consecutively. For example, typically, a media player application consecutively executes a function to adjust volume. Particularly, to determine whether to obtain implicit feedback for the target gesture, the processor 240 determines whether consecutive prediction outputs 990 from the gesture classifier 980 for the consecutive gesture samples 925 correspond to a function that an application 262 typically executes consecutively. The determination, that the consecutive prediction outputs 990 from the gesture classifier 980 for the consecutive gesture samples 925 correspond to the function that the application 262 typically executes consecutively, is made by the processor 240 in response to a determination that (i) the motion similarity condition is satisfied; and (ii) the consecutive prediction outputs include at least one of: identical prediction outputs; or a reference type of gesture followed by number of non-gesture prediction outputs followed by the reference type of gesture. Based on a determination that the consecutive prediction outputs correspond to the function that the application typically executes consecutively, the processor 240 determines to obtain implicit feedback and collect the consecutive gesture samples into a set of typically-consecutive samples labeled using the identical prediction outputs or labeled using the reference type of gesture. The implicit feedback is obtained at block 1732. At block 1738, the consecutive gesture samples are collected (e.g., added) into the set of typically-consecutive samples.

In some embodiments, block 1740 incorporates some procedures performed in FIG. 13A. Particularly, at block 1742, the processor 240 computes first distance measurements between the features corresponding to the obtained gesture sample 925 and the features corresponding to each among the dataset of pre-existing validated gesture samples 267, respectively. As illustrated by the affirmative arrow (YES: Valid), the processor 240 determines that the gesture sample associated with the label is valid, based on a determination that, for at least N among the dataset of pre-existing validated gesture samples, the first distance measurements satisfy a proximity condition defined based on the distance threshold, respectively. As illustrated by the negative arrow (NO: Invalid), the processor 240 determines the gesture sample associated with the label is an outlier that is invalid, based on a determination the first distance measurements do not satisfy the proximity condition for at least N among the dataset of pre-existing validated gesture samples, respectively.

In some embodiments, block 1740 incorporates some procedures performed in FIG. 13B. Particularly, to determine whether the gesture sample associated with the label is an outlier that is invalid, the processor 240 makes this determination based on multiple bases. One basis is the determination that the first distance measurements do not satisfy the proximity condition for at least N among the dataset of pre-existing validated gesture samples, respectively. An additional basis is the determination at block 1744, wherein the processor 240 determines whether to revalidate or confirm invalidation. That is, the processor 240 computes second distance measurements between the extracted features corresponding to the obtained gesture sample and the extracted features corresponding to each among a dataset of pre-existing invalidated gesture samples 282, respectively. The processor 240 determines the gesture sample associated with the label is an outlier that is invalid, based on a determination that the second distance measurements do not satisfy the proximity condition for at least a threshold number (M) among the dataset of pre-existing invalidated gesture samples 282, respectively.

At block 1746, the processor 240 determines the obtained gesture sample associated with the label is revalidated as the training sample, based on: a determination that the second distance measurements satisfy the proximity condition for at least M among the dataset of pre-existing invalidated gesture samples 282, respectively; and a determination that the at least M pre-existing invalidated gesture samples are associated with the same label associated with the obtained gesture sample. The at least M pre-existing invalidated gesture samples are revalidated as a training sample set labeled as the same label associated with the obtained gesture sample.

In some embodiments, block 1750 incorporates some procedures performed in FIG. 14. Particularly, the processor 240 determines an operating environment of the electronic device based on a motion pattern identified in motion sensor data from sensors of the electronic device. Further, the processor 240 adjusts at least one parameter or the model of the gesture classifier based on the operating environment, wherein the adjustment to the at least one parameter or the model includes an adjustment to cutoff frequency for clutter removal.

In some embodiments, block 1760 incorporates some procedures performed in FIG. 15. The processor 240 updates the model of the gesture classifier to apply different confidence thresholds to a penultimate output of the gesture classifier based on different probability rates of usage for each type of gesture in a gesture vocabulary, such that a greater confidence threshold is applied based on a lower probability rate of usage.

In some embodiments, the method 1700 incorporates some procedures performed in FIG. 16. The processor 240 detects a bad temporal correlation based on a determination that the gesture classifier, while using a base model as the model, outputs a set of one or a sequence of prediction outputs that satisfies a definition of a bad event while a temporal correlation timer is inactive. In response to the bad temporal correlation detected, the processor 240 resets the temporal correlation timer and switches the gesture classifier 980 to use a more-complex model for a duration of the temporal correlation timer, wherein the more-complex model is designed to classify the gesture sample more accurately than the base model and consumes more computational resources than the base model.

Although FIG. 17 illustrates an example method 1700 for robustifying radar-based gesture recognition solution using contextual information, various changes may be made to FIG. 17. For example, while shown as a series of steps, various steps in FIG. 17 could overlap, occur in parallel, occur in a different order, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   obtaining a gesture sample via a gesture classifier and a prediction output from the gesture classifier indicating a type of gesture that the gesture classifier associated with the gesture sample, wherein the gesture sample includes parameters of features extracted from radar signals based on user motion in performance of a gesture;
   determining whether to obtain feedback for a target gesture associated with the gesture sample and the prediction output;
   in response to a determination to obtain the feedback, obtaining the feedback for the target gesture, the feedback including a label indicating a type of gesture;
   determining whether the gesture sample associated with the label is valid based on comparison to a dataset of pre-existing validated gesture samples and a distance threshold; and
   in response to determining that the gesture sample associated with the label is valid, determining whether to update a model for the gesture classifier using the validated gesture sample as a training sample.

2. The method of claim 1, wherein:
   determining whether to obtain the feedback for the target gesture comprises:
      after a timer expires, determine to obtain explicit feedback based on a determination that the prediction output from the gesture classifier corresponds to a pair of gestures from a gesture vocabulary that are confused with each other at an error rate that exceeds a threshold confusion ratio; and
   obtaining the feedback comprises:
      requesting explicit feedback from a user to compare a type of gesture that the user performed to at least one type of gesture from among the gesture vocabulary.

3. The method of claim 2, wherein duration of the timer is determined based on at least one of a mean error rate ($\varepsilon$), a variance ($\sigma$) of the error rate, or a number of samples (n).

4. The method of claim 1, wherein:
   determining whether to obtain the feedback for the target gesture comprises:
      determining whether the gesture classifier output different prediction outputs for consecutive gesture samples including a current gesture sample and a previous gesture sample;
      determining whether a specified extracted feature of the current gesture sample and the specified extracted feature of the previous gesture sample are similar to each other based on satisfying a motion similarity condition that is defined by a distance metric; and
      in response to a determination that the gesture classifier output the different prediction outputs for consecutive gesture samples and that the motion similarity condition is satisfied, determining to obtain implicit feedback and collect the consecutive gesture samples into a set of potentially misclassified samples; and
   obtaining the implicit feedback comprises labeling the set of potentially misclassified samples using a final prediction output from the gesture classifier in the consecutive gesture samples collected.

5. The method of claim 4, further comprising:
   determining whether consecutive prediction outputs from the gesture classifier for the consecutive gesture samples correspond to a function that an application typically executes consecutively, in response to a determination that the motion similarity condition is satisfied and that the consecutive prediction outputs include at least one of:
      identical prediction outputs; or
      a reference type of gesture followed by number of non-gesture prediction outputs followed by the reference type of gesture; and
   based on a determination that the consecutive prediction outputs correspond to the function that the application typically executes consecutively, determining to obtain implicit feedback and collect the consecutive gesture samples into a set of typically-consecutive samples labeled using the identical prediction outputs or the reference type of gesture.

6. The method of claim 1, further comprising:
   computing first distance measurements between the features corresponding to the obtained gesture sample and the features corresponding to each among the dataset of pre-existing validated gesture samples, respectively;
   determining that the gesture sample associated with the label is valid, based on a determination that, for at least N among the dataset of pre-existing validated gesture samples, the first distance measurements satisfy a proximity condition defined based on the distance threshold, respectively; and
   determining the gesture sample associated with the label is an outlier that is invalid, based on a determination the first distance measurements do not satisfy the proximity condition for at least N among the dataset of pre-existing validated gesture samples, respectively.

7. The method of claim 6, further comprising:
   computing second distance measurements between the features corresponding to the obtained gesture sample and the features corresponding to each among a dataset of pre-existing invalidated gesture samples, respectively;
   determining the gesture sample associated with the label is an outlier that is invalid, based on a determination that the second distance measurements do not satisfy the proximity condition for at least a threshold number (M) among the dataset of pre-existing invalidated gesture samples, respectively; and
   determining the obtained gesture sample associated with the label is revalidated as the training sample, based on:
      a determination that the second distance measurements satisfy the proximity condition for at least M among the dataset of pre-existing invalidated gesture samples, respectively; and
      a determination that the at least M pre-existing invalidated gesture samples are associated with the same label associated with the obtained gesture sample,
   wherein the at least M pre-existing invalidated gesture samples are revalidated as a training sample set labeled as the same label associated with the obtained gesture sample.

8. The method of claim 1, further comprising:
  determining an operating environment of an electronic device based on a motion pattern identified in motion sensor data from sensors of the electronic device; and
  adjusting at least one parameter or the model of the gesture classifier based on the operating environment, wherein the adjustment to the at least one parameter or the model includes an adjustment to cutoff frequency for clutter removal.

9. The method of claim 1, further comprising updating the model of the gesture classifier to apply different confidence thresholds to a penultimate output of the gesture classifier based on different probability rates of usage for each type of gesture in a gesture vocabulary, such that a greater confidence threshold is applied based on a lower probability rate of usage.

10. The method of claim 1, further comprising:
  detecting a bad temporal correlation based on a determination that the gesture classifier, while using a base model as the model, outputs a set of one or a sequence of prediction outputs that satisfies a definition of a bad event while a temporal correlation timer is inactive; and
  in response to the bad temporal correlation detected:
    resetting the temporal correlation timer; and
    switching the gesture classifier to use a more-complex model for a duration of the temporal correlation timer, wherein the more-complex model is designed to classify the gesture sample more accurately than the base model and consumes more computational resources than the base model.

11. An electronic device comprising:
  a transceiver configured to transmit and receive radar signals; and
  a processor operably connected to the transceiver and configured to:
    obtain a gesture sample via a gesture classifier and a prediction output from the gesture classifier indicating a type of gesture that the gesture classifier associated with the gesture sample, wherein the gesture sample includes parameters of features extracted from the radar signals based on user motion in performance of a gesture;
    determine whether to obtain feedback for a target gesture associated with the gesture sample and the prediction output;
    in response to a determination to obtain the feedback, obtain the feedback for the target gesture, the feedback including a label indicating a type of gesture;
    determine whether the gesture sample associated with the label is valid based on comparison to a dataset of pre-existing validated gesture samples and a distance threshold; and
    in response to determining that the gesture sample associated with the label is valid, determine whether to update a model for the gesture classifier using the validated gesture sample as a training sample.

12. The electronic device of claim 11, wherein:
  to determine whether to obtain the feedback for the target gesture, the processor is further configured to:
    after a timer expires, determine to obtain explicit feedback based on a determination that the prediction output from the gesture classifier corresponds to a pair of gestures from a gesture vocabulary that are confused with each other at an error rate that exceeds a threshold confusion ratio; and
  to obtain the feedback, the processor is further configured to request explicit feedback from a user to compare a type of gesture that the user performed to at least one type of gesture from among the gesture vocabulary.

13. The electronic device of claim 12, wherein duration of the timer is determined based on at least one of a mean error rate ($\varepsilon$), a variance ($\sigma$) of the error rate, or a number of samples (n).

14. The electronic device of claim 11, wherein:
  to determine whether to obtain the feedback for the target gesture, the processor is further configured to:
    determine whether the gesture classifier output different prediction outputs for consecutive gesture samples including a current gesture sample and a previous gesture sample;
    determine whether a specified extracted feature of the current gesture sample and the specified extracted feature of the previous gesture sample are similar to each other based on satisfying a motion similarity condition that is defined by a distance metric; and
    in response to a determination that the gesture classifier output the different prediction outputs for consecutive gesture samples and that the motion similarity condition is satisfied, determine to obtain implicit feedback and collect the consecutive gesture samples into a set of potentially misclassified samples; and
  to obtain the implicit feedback, the processor is further configured to label the set of potentially misclassified samples using a final prediction output from the gesture classifier in the consecutive gesture samples collected.

15. The electronic device of claim 14, wherein the processor is further configured to:
  determine whether consecutive prediction outputs from the gesture classifier for the consecutive gesture samples correspond to a function that an application typically executes consecutively, in response to a determination that the motion similarity condition is satisfied and that the consecutive prediction outputs include at least one of:
    identical prediction outputs; or
    a reference type of gesture followed by number of non-gesture prediction outputs followed by the reference type of gesture; and
  based on a determination that the consecutive prediction outputs correspond to the function that the application typically executes consecutively, determine to obtain implicit feedback and collect the consecutive gesture samples into a set of typically-consecutive samples labeled using the identical prediction outputs or the reference type of gesture.

16. The electronic device of claim 11, wherein the processor is further configured to:
  compute first distance measurements between the features corresponding to the obtained gesture sample and the features corresponding to each among the dataset of pre-existing validated gesture samples, respectively;
  determine that the gesture sample associated with the label is valid, based on a determination that, for at least N among the dataset of pre-existing validated gesture samples, the first distance measurements satisfy a proximity condition defined based on the distance threshold, respectively; and
  determine the gesture sample associated with the label is an outlier that is invalid, based on a determination the first distance measurements do not satisfy the proximity condition for at least N among the dataset of pre-existing validated gesture samples, respectively.

17. The electronic device of claim 16, wherein the processor is further configured to:
- compute second distance measurements between the features corresponding to the obtained gesture sample and the features corresponding to each among a dataset of pre-existing invalidated gesture samples, respectively;
- determine the gesture sample associated with the label is an outlier that is invalid, based on a determination that the second distance measurements do not satisfy the proximity condition for at least a threshold number (M) among the dataset of pre-existing invalidated gesture samples, respectively; and
- determine the obtained gesture sample associated with the label is revalidated as the training sample, based on:
  - a determination that the second distance measurements satisfy the proximity condition for at least M among the dataset of pre-existing invalidated gesture samples, respectively; and
  - a determination that the at least M pre-existing invalidated gesture samples are associated with the same label associated with the obtained gesture sample,
  - wherein the at least M pre-existing invalidated gesture samples are revalidated as a training sample set labeled as the same label associated with the obtained gesture sample.

18. The electronic device of claim 11, wherein the processor is further configured to:
- determine an operating environment of the electronic device based on a motion pattern identified in motion sensor data from sensors of the electronic device; and
- adjust at least one parameter or the model of the gesture classifier based on the operating environment, wherein the adjustment to the at least one parameter or the model includes an adjustment to cutoff frequency for clutter removal.

19. The electronic device of claim 11, wherein the processor is further configured to update the model of the gesture classifier to apply different confidence thresholds to a penultimate output of the gesture classifier based on different probability rates of usage for each type of gesture in a gesture vocabulary, such that a greater confidence threshold is applied based on a lower probability rate of usage.

20. The electronic device of claim 11, wherein the processor is further configured to:
- detect a bad temporal correlation based on a determination that the gesture classifier, while using a base model as the model, outputs a set of one or a sequence of prediction outputs that satisfies a definition of a bad event while a temporal correlation timer is inactive; and
- in response to the bad temporal correlation detected:
  - reset the temporal correlation timer; and
  - switch the gesture classifier to use a more-complex model for a duration of the temporal correlation timer, wherein the more-complex model is designed to classify the gesture sample more accurately than the base model and consumes more computational resources than the base model.

* * * * *